US012027742B2

(12) United States Patent
Taguchi et al.

(10) Patent No.: US 12,027,742 B2
(45) Date of Patent: Jul. 2, 2024

(54) DISTRIBUTED CONSTANT FILTER, DISTRIBUTED CONSTANT LINE RESONATOR, AND MULTIPLEXER

(71) Applicant: Murata Manufacturing Co., Ltd., Nagaokakyo (JP)

(72) Inventors: Yoshinori Taguchi, Nagaokakyo (JP); Kengo Onaka, Nagaokakyo (JP); Hitoshi Tada, Nagaokakyo (JP); Yasuo Yamada, Nagaokakyo (JP); Muneyoshi Yamamoto, Nagaokakyo (JP); Tomohiro Nagai, Nagaokakyo (JP); Keiichi Hirose, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 197 days.

(21) Appl. No.: 17/824,940

(22) Filed: May 26, 2022

(65) Prior Publication Data

US 2022/0285808 A1 Sep. 8, 2022

Related U.S. Application Data

(63) Continuation of application No. PCT/JP2020/039652, filed on Oct. 22, 2020.

(30) Foreign Application Priority Data

Nov. 29, 2019 (JP) ................................ 2019-216296

(51) Int. Cl.
*H01P 1/203* (2006.01)
*H01P 7/08* (2006.01)

(52) U.S. Cl.
CPC ................ *H01P 1/203* (2013.01); *H01P 7/08* (2013.01)

(58) Field of Classification Search
CPC ........ H01P 1/2002; H01P 1/202; H01P 1/205; H01P 1/2053; H01P 1/2056; H01P 1/20882; H01P 1/201; H01P 1/203; H01P 3/16; H01P 3/122; H01P 7/00; H01P 7/04; H01P 7/08; H03H 7/01; H03H 7/0138;
(Continued)

(56) References Cited

FOREIGN PATENT DOCUMENTS

| | | | |
|---|---|---|---|
| JP | 4-43703 | A | 2/1992 |
| JP | 6-97705 | A | 4/1994 |
| JP | 6-140804 | A | 5/1994 |

(Continued)

OTHER PUBLICATIONS

JPH06140804A Google translation (Year: 1994).*

(Continued)

*Primary Examiner* — Stephen E. Jones
(74) *Attorney, Agent, or Firm* — XSENSUS LLP

(57) ABSTRACT

A distributed constant filter includes a resonator that is not grounded and a first ground electrode. The first ground electrode faces the resonator in a first direction (Z). The resonator is a distributed constant line resonator. The resonator includes a plurality of distributed constant lines and a via conductor. The plurality of distributed constant lines are arranged in layers in the first direction (Z). The via conductor extends in the first direction (Z). Each of the plurality of distributed constant lines is connected to the via conductor only at one end portion of both end portions of the distributed constant line.

16 Claims, 21 Drawing Sheets

(58) Field of Classification Search
CPC ............... H03H 7/0153; H03H 7/0161; H03H 2007/013; H03H 2007/0192
See application file for complete search history.

(56) References Cited

FOREIGN PATENT DOCUMENTS

| | | | |
|---|---|---|---|
| JP | 2000-357902 | A | 12/2000 |
| JP | 2003-69306 | A | 3/2003 |
| JP | 2007-201763 | A | 8/2007 |
| JP | 2007-318271 | A | 12/2007 |

OTHER PUBLICATIONS

English Translation of Written Opinion mailed on Jan. 26, 2021, received for PCT Application PCT/JP2020/039652, Filed on Oct. 22, 2020.
International Search Report and Written Opinion mailed on Jan. 26, 2021, received for PCT Application PCT/JP2020/039652, Filed on Oct. 22, 2020, 8 pages including English Translation.
Ericsson, "On mm-wave filters and requirement impact", 3GPP TSG-RAN WG4 meeting #85, R4-1712718, Nov. 27-Dec. 1, 2017, pp. 1-5.
Dahlman et al., "RF Technologies at mm-Wave Frequencies", 5G NR: The Next Generation Wireless Access Technology, Chapter 19, Academic Press, 2018, pp. 383-405.

* cited by examiner

DISTRIBUTED CONSTANT FILTER, DISTRIBUTED CONSTANT LINE RESONATOR, AND MULTIPLEXER

CROSS-REFERENCE TO RELATED APPLICATIONS

The present application is a continuation application of International Patent Application No. PCT/JP2020/039652, filed Oct. 22, 2020, which claims priority to Japanese Patent Application No. 2019-216296, filed Nov. 29, 2019, the entire contents of each of which being incorporated herein by reference.

TECHNICAL FIELD

The present disclosure relates to a distributed constant filter, a distributed constant line resonator, and a multiplexer including the distributed constant filter.

BACKGROUND ART

Conventionally, distributed constant filters have been known. For example, a filter including four resonant elements is disclosed in Japanese Unexamined Patent Application Publication No. 2007-318271 (Patent Document 1). Each of the four resonant elements has a structure in which a microstrip line with both end portions open is bent and has an electrical length which is almost an integral multiple of a half wavelength within a frequency range defined by a center frequency of the filter and a bandwidth of the filter.

As a configuration which achieves reduction in loss in a distributed constant filter, for example, a symmetrical strip line resonator including a plurality of strip conductors arranged in layers is disclosed in Japanese Unexamined Patent Application Publication No. 4-43703 (Patent Document 2). The plurality of strip conductors are connected to each other by a through-hole at each of both end portions of the plurality of strip conductors. As a result, in the symmetrical strip line resonator, in-phase signals can be advantageously input to both the strip conductors.

CITATION LIST

Patent Document

Patent Document 1: Japanese Unexamined Patent Application Publication No. 2007-318271

Patent Document 2: Japanese Unexamined Patent Application Publication No. 4-43703

SUMMARY

Technical Problems

The size of a distributed constant line resonator which resonates with a signal needs to be reduced with reduction in a wavelength of the signal. In order to cause a distributed constant filter to support a signal having an ultrashort wavelength, such as a millimeter-wave signal, it is necessary to form a distributed constant line resonator from a very small conductor. As a result, characteristics of a distributed constant filter may degrade due to variation in through-hole ("via conductor") formation accuracy between distributed constant line resonators or variation in position accuracy.

The present disclosure has been made in order to solve the above-described problem, as well as other problems, and has as one object to reduce manufacturing variation between distributed constant line resonators and degradation of characteristics of a distributed constant filter due to the manufacturing variation.

Solutions

A distributed constant filter according to one aspect of the present disclosure includes at least one resonator and a first ground electrode. The at least one resonator is not grounded. The first ground electrode faces the at least one resonator in a first direction. Each of the at least one resonator is a distributed constant line resonator. Each resonator of the at least one resonator includes a plurality of distributed constant lines and a via conductor. The plurality of distributed constant lines are arranged in layers in the first direction. The via conductor extends in the first direction. Each distributed constant line of the plurality of distributed constant lines is connected to the via conductor only at one end portion of the distributed constant line.

A distributed constant line resonator according to another aspect of the present disclosure includes a plurality of distributed constant lines and a via conductor. The plurality of distributed constant lines are arranged in layers in a first direction and are not grounded. The via conductor extends in the first direction. Each of the plurality of distributed constant lines is connected to the via conductor only at one end portion of the distributed constant line.

Advantageous Effects

In the distributed constant filter according to the present disclosure, each of the plurality of distributed constant lines is connected to the via conductor only at the one end portion of both the end portions of the distributed constant line. This allows reduction in degradation of characteristics of a distributed constant filter due to manufacturing variation between distributed constant line resonators.

In the distributed constant line resonator according to the present disclosure, each of the plurality of distributed constant lines is connected to the via conductor only at the one end portion of both the end portions of the distributed constant line. This allows reduction in manufacturing variation.

DESCRIPTION OF EMBODIMENTS

Figure 1:
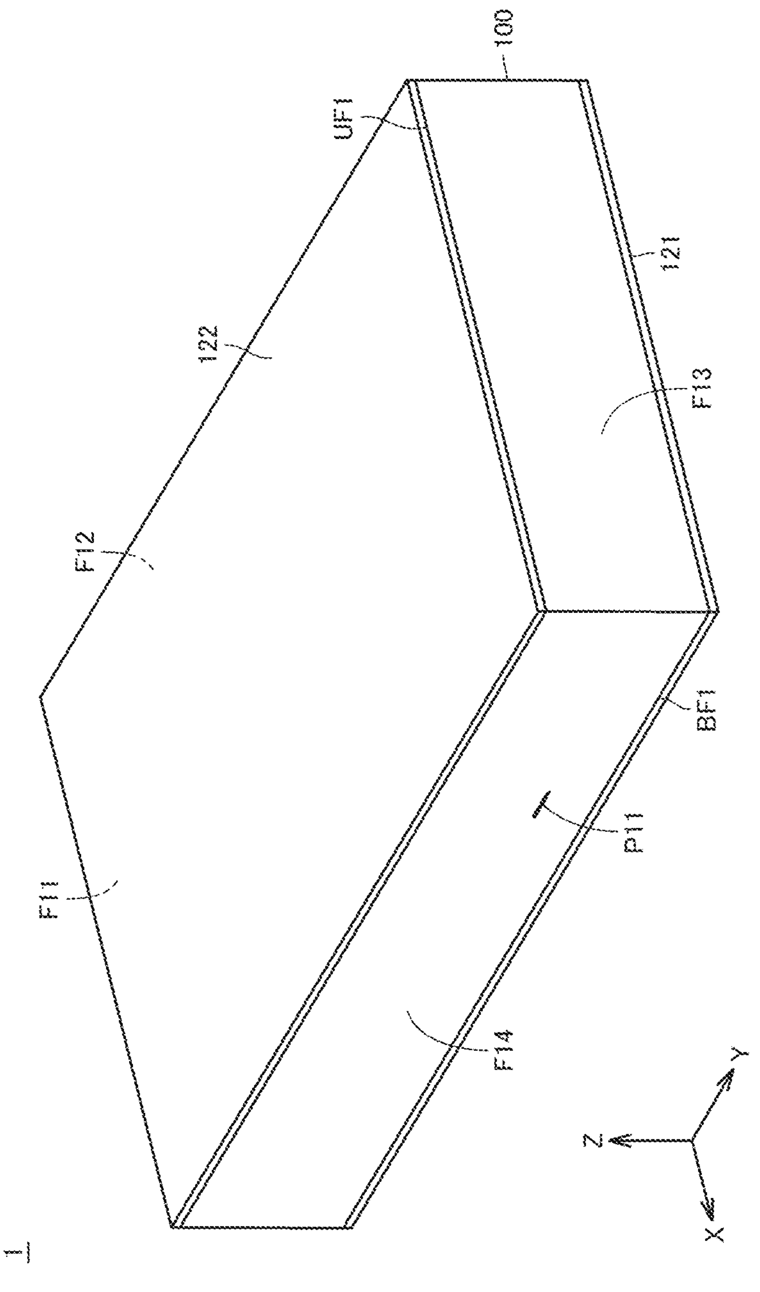
FIG. 1 is an external perspective view of a distributed constant filter according to a first embodiment.

Embodiments will be described below in detail with reference to the drawings. Identical or corresponding portions in the drawings are denoted by identical reference characters, and a description thereof will not be repeated in principle.

First Embodiment

Figure 2:
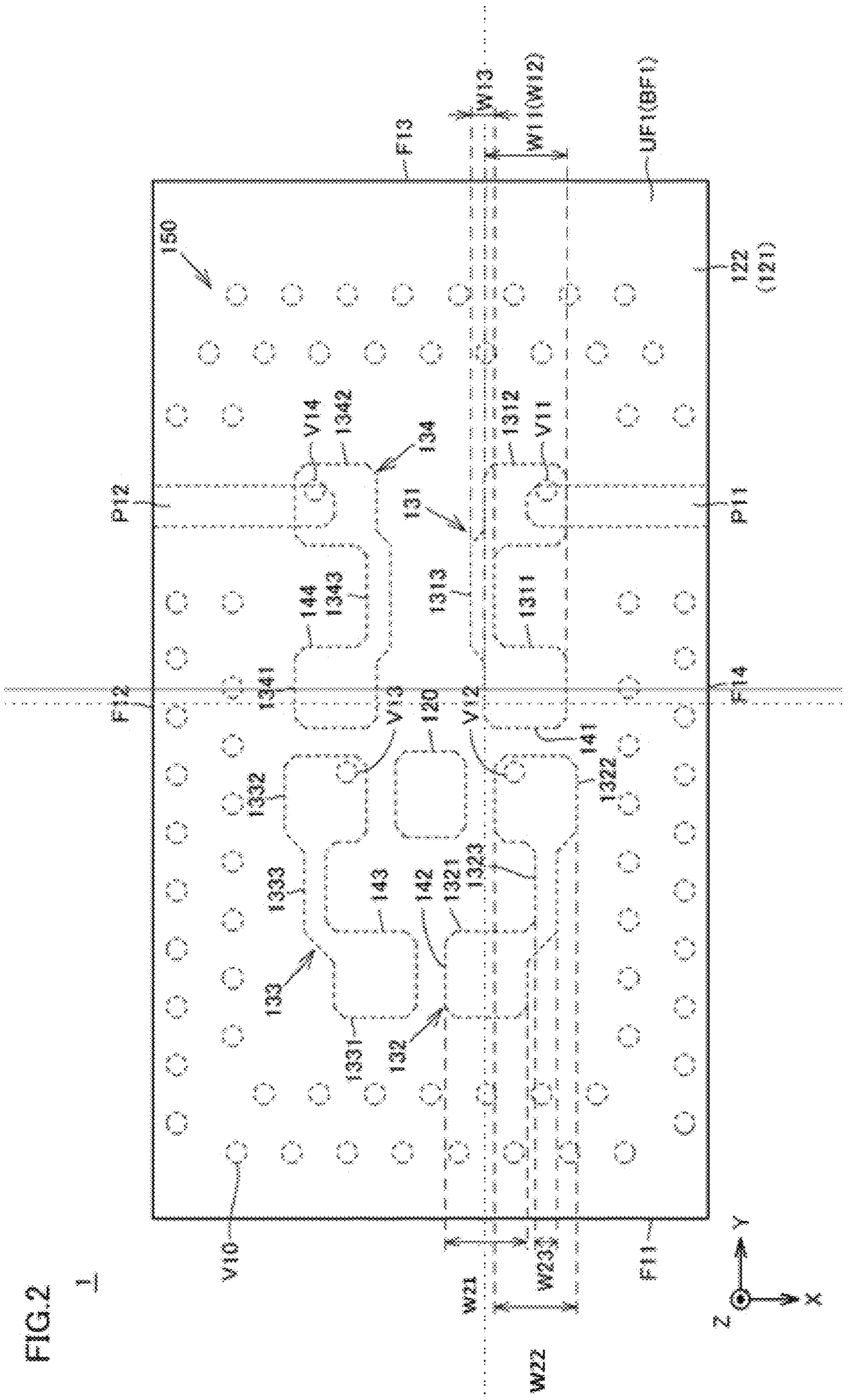
FIG. 2 is a view of the distributed constant filter in FIG. 1 as viewed in plan view from a Z-axis direction.
Figure 3:
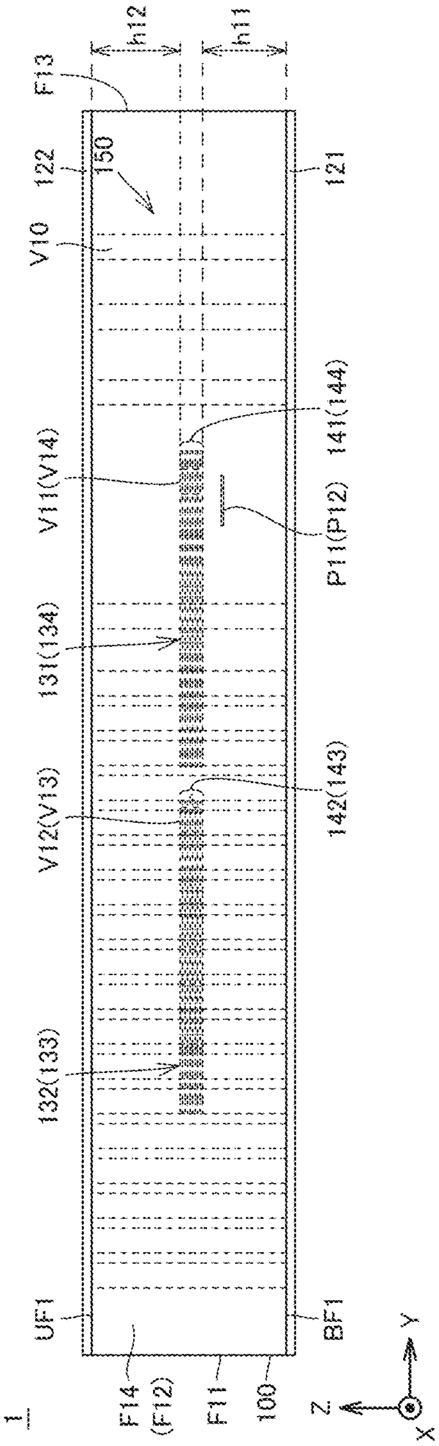
FIG. 3 is a view of the distributed constant filter in FIG. 1 as viewed in plan view from an X-axis direction.
Figure 4:
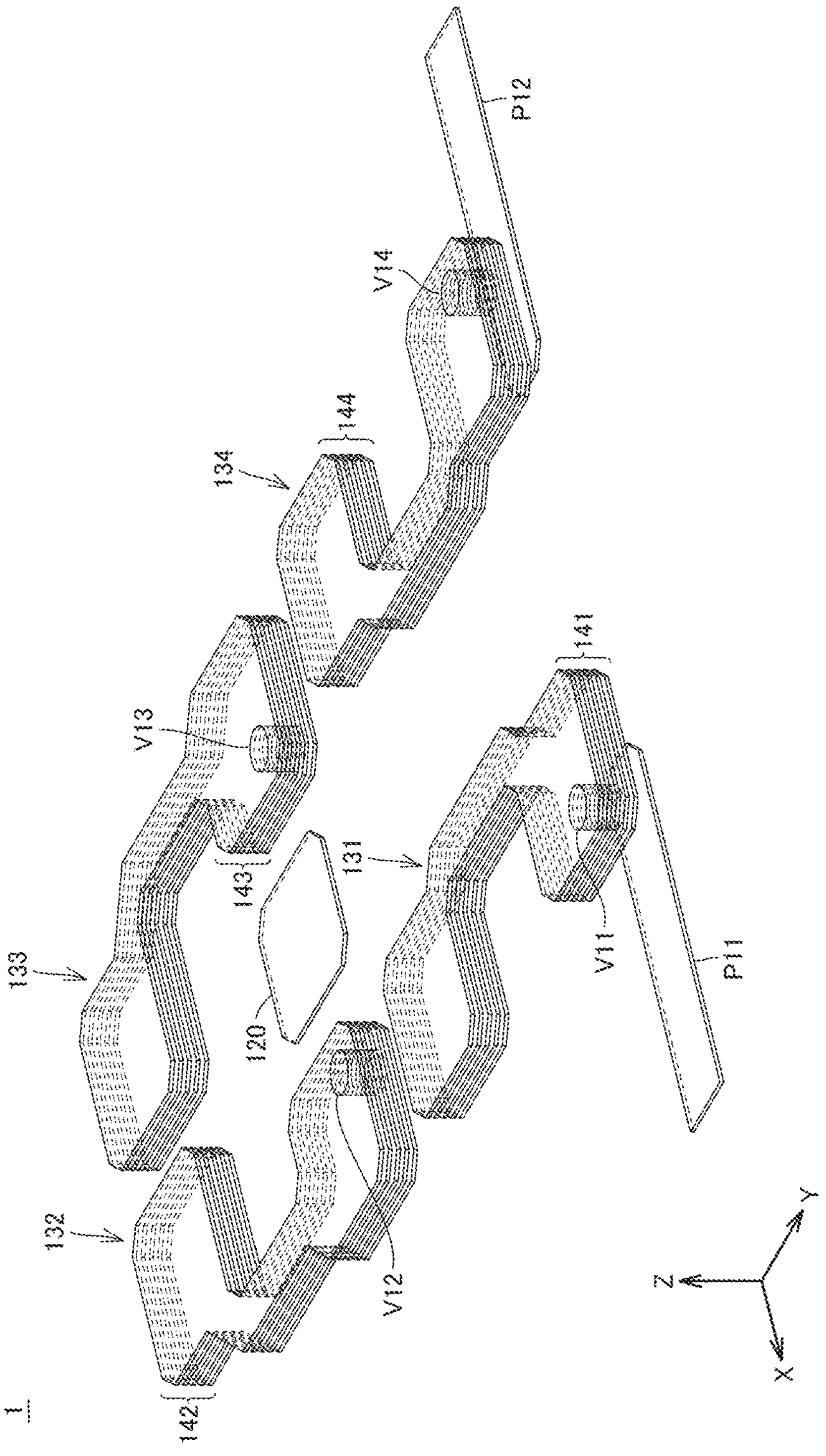
FIG. 4 is a view showing a plurality of electrodes formed inside the distributed constant filter in FIG. 1.

FIG. 1 is an external perspective view of a distributed constant filter 1 according to a first embodiment. FIG. 2 is a view of the distributed constant filter 1 in FIG. 1 as viewed in plan view from a Z-axis direction. FIG. 3 is a view of the distributed constant filter 1 in FIG. 1 as viewed in plan view from an X-axis direction. FIG. 4 is a perspective view showing a plurality of electrodes formed inside the distributed constant filter 1 of FIG. 1. In FIGS. 1 to 4, an X axis, a Y axis, and a Z axis are orthogonal to each other. The same applies to FIGS. 5, 10, 11, 13 to 23, 24, and 26 (to be described later).

Referring to FIGS. 1 to 4, the distributed constant filter 1 has the shape of, for example, a rectangular parallelepiped. The distributed constant filter 1 includes a dielectric substrate 100, a distributed constant line resonator 131 (a first resonator), a distributed constant line resonator 132 (a third resonator), a distributed constant line resonator 133 (a fourth resonator), a distributed constant line resonator 134 (a second resonator), a ground electrode 121 (a first ground electrode), a ground electrode 122 (a second ground electrode), a ground conductor portion 150, a coupling electrode 120, an input/output terminal P11 (a first terminal), and an input/output terminal P12 (a second terminal).

Referring to FIG. 1, the dielectric substrate 100 is formed from a plurality of dielectric layers stacked in the Z-axis direction (a first direction). Surfaces at outermost layers of the dielectric substrate 100 perpendicular to the Z-axis direction will be referred to as an upper surface UF1 and a bottom surface BF1. The upper surface UF1 and the bottom surface BF1 face the Z-axis direction. Of surfaces parallel to the Z-axis direction, surfaces parallel to a ZX plane will be referred to as side surfaces F11 and F13. Of the surfaces parallel to the Z-axis direction, surfaces parallel to a YZ plane will be referred to as side surfaces F12 and F14.

The ground electrode 121 is formed on the bottom surface BF1. The ground electrode 121 covers the bottom surface BF1. The ground electrode 122 is arranged on the upper surface UF1. The ground electrode 122 covers the upper surface UF1. The input/output terminals P11 and P12 are respectively exposed at the side surfaces F14 and F12.

Referring to FIGS. 2 and 3, the ground conductor portion 150 includes a plurality of via conductors V10. The distributed constant line resonators 131 to 134 are arranged between the ground electrodes 121 and 122 and are surrounded by the plurality of via conductors V10. Each of the plurality of via conductors V10 connects the ground electrodes 121 and 122. The distributed constant line resonators 131 to 134 are strip lines which are sandwiched between the ground electrodes 121 and 122 in the Z-axis direction.

Each of the distributed constant line resonators 131 to 134 is not grounded. Both end portions of each of the distributed constant line resonators 131 to 134 are open ends where voltages can change. In each of the distributed constant line resonators 131 to 134, a maximum length of a path through which a signal can pass is one-half of a wavelength (specified wavelength) inside the dielectric substrate 100 of a desired signal which can pass through the distributed constant filter 1. That is, each of the distributed constant line resonators 131 to 134 is a $\lambda/2$ resonator. The distributed constant filter 1 is a four-stage distributed constant filter which is formed from four $\lambda/2$ resonators. A stage number (the number of resonators) of the distributed constant filter 1 may be two or three, or five or more. Note that a wavelength of a signal inside the dielectric substrate 100 is made shorter than a wavelength of the signal in a vacuum in accordance with the magnitude of a permittivity of the dielectric substrate 100.

Referring also to FIG. 4, the distributed constant line resonator 131 includes a plurality of distributed constant lines 141 and a via conductor V11. The plurality of distributed constant lines 141 are arranged in layers in the Z-axis direction. The via conductor V11 extends in the Z-axis direction. The distributed constant line resonator 131 is formed from an end portion 1311 (a first end portion), an end portion 1312 (a second end portion), and an intermediate portion 1313. The intermediate portion 1313 extends in a Y-axis direction (a second direction) and connects the end portions 1311 and 1312. Each of the plurality of distributed constant lines 141 is connected to the via conductor V11 at the end portion 1312. Each of the plurality of distributed constant lines 141 may be connected to the via conductor V11 at the end portion 1311. A length (width) w11 of the end portion 1311 and a width w12 of the end portion 1312 in the X-axis direction (a third direction) are longer than a width w13 of the intermediate portion 1313. The width w12 may be the same as or different from the width w11.

The distributed constant line resonator 134 includes a plurality of distributed constant lines 144 and a via conductor V14. The plurality of distributed constant lines 144 are arranged in layers in the Z-axis direction. The via conductor V14 extends in the Z-axis direction. The distributed constant line resonator 134 is formed from an end portion 1341 (a first end portion), an end portion 1342 (a second end portion), and an intermediate portion 1343. The intermediate portion 1343 extends in the Y-axis direction and connects the end portions 1341 and 1342. Each of the plurality of distributed constant lines 144 is connected to the via conductor V14 at the end portion 1342. Each of the plurality of distributed constant lines 144 may be connected to the via conductor V14 at the end portion 1341. A structure of the distributed constant line resonator 134 is almost symmetrical to a structure of the distributed constant line resonator 131 with respect to an axis of symmetry parallel to the Y axis. As in the distributed constant line resonator 131, a width of the end portion 1341 and a width of the end portion 1342 are longer than a width of the intermediate portion 1343.

The distributed constant line resonator 132 includes a plurality of distributed constant lines 142 and a via conductor V12. The plurality of distributed constant lines 142 are arranged in layers in the Z-axis direction. The via conductor V12 extends in the Z-axis direction. The distributed constant line resonator 132 is formed from an end portion 1321 (a first end portion), an end portion 1322 (a second end portion), and an intermediate portion 1323. The intermediate portion 1323 extends in the Y-axis direction and connects the end portions 1321 and 1322. Each of the plurality of distributed constant lines 142 is connected to the via conductor V12 at the end portion 1322. Each of the plurality of distributed constant lines 142 may be connected to the via conductor V12 at the end portion 1321. A width w21 of the end portion 1321 and a width w22 of the end portion 1322 are longer than a width w23 of the intermediate portion 1313. The width w22 may be the same as or different from the width w21.

The distributed constant line resonator 133 includes a plurality of distributed constant lines 143 and a via conductor V13. The plurality of distributed constant lines 143 are arranged in layers in the Z-axis direction. The via conductor V13 extends in the Z-axis direction. The distributed constant line resonator 133 is formed from an end portion 1331 (a first end portion), an end portion 1332 (a second end portion), and an intermediate portion 1333. The intermediate portion 1333 extends in the Y-axis direction and connects the end portions 1331 and 1332. Each of the plurality of distributed constant lines 143 is connected to the via conductor V13 at the end portion 1332. Each of the plurality of distributed constant lines 143 may be connected to the via conductor V13 at the end portion 1331. A structure of the distributed constant line resonator 133 is almost symmetrical to a structure of the distributed constant line resonator 132 with respect to an axis of symmetry parallel to the Y axis. As in the distributed constant line resonator 132, a width of the end portion 1331 and a width of the end portion 1332 are longer than a width of the intermediate portion 1333.

Since the plurality of distributed constant lines of each of the distributed constant line resonators 131 to 134 are connected to each other at an end portion of the distributed constant line resonator, respective potentials (polarities) of the plurality of distributed constant lines coincide with each other. It is thus possible to make resonant modes of respective currents flowing through the plurality of distributed constant lines coincide with each other. As a result, directions in which respective currents flow through the plurality of distributed constant lines can be made to coincide with each other. Since the number of via conductors required to make directions of currents flowing through the plurality of distributed constant lines of each of the distributed constant line resonators 131 to 134 coincide with each other is one in the distributed constant filter 1, manufacturing variation associated with via conductor formation can be reduced.

In each of the distributed constant line resonators 131 to 134, the intermediate portion is thinner than the two end portions. Each of the distributed constant line resonators 131 to 134 is a stepped impedance resonator (SIR) in which an impedance of the distributed constant line resonator changes stepwise. Since each of the distributed constant line resonators 131 to 134 is an SIR, a frequency (resonant frequency) of a fundamental wave at which the distributed constant line resonator resonates can be set not more than one-half of a secondary resonant frequency. As a result, each of the distributed constant line resonators 131 to 134 can be downsized, and a high-order resonant frequency of an undesired wave can be relatively kept away from the resonant frequency.

The distributed constant line resonators 131 and 134 face each other in the X-axis direction. The distributed constant line resonator 131 curves away from the distributed constant line resonator 134 at the end portions 1311 and 1312 of the distributed constant line resonator 131. The distributed constant line resonator 134 curves away from the distributed constant line resonator 131 at the end portions 1341 and 1342. A distance between the intermediate portions 1313 and 1343 in the X-axis direction is shorter than each of a distance between the end portions 1311 and 1341 and a distance between the end portions 1312 and 1342. Magnetic field intensity is highest at the intermediate portions 1313 and 1343, and electric field intensity is highest at the end portions 1311 and 1341 and the end portions 1312 and 1342. As a result, in the distributed constant line resonators 131 and 134, magnetic-field coupling which occurs between the intermediate portions 1313 and 1343 is stronger and more dominant than electric-field coupling which occurs between the end portions 1311 and 1341 and electric-field coupling which occurs between the end portions 1312 and 1342.

The distributed constant line resonators 132 and 133 face each other in the X-axis direction. The distributed constant line resonator 132 curves toward the distributed constant line resonator 133 at the end portion 1321. The distributed constant line resonator 133 curves toward the distributed constant line resonator 132 at the end portion 1331. A distance between the end portions 1321 and 1331 and a distance between the end portions 1322 and 1332 in the X-axis direction are shorter than a distance between the intermediate portions 1323 and 1333. The distance between the end portions 1322 and 1332 in the X-axis direction is longer than the distance between the end portions 1321 and 1331. However, electric-field coupling which occurs between the end portions 1322 and 1332 is strengthened by the coupling electrode 120 that is arranged between the end portions 1322 and 1332. As a result, in the distributed constant line resonators 132 and 133, each of electric-field coupling which occurs between the end portions 1321 and 1331 and the electric-field coupling which occurs between the end portions 1322 and 1332 is stronger and more dominant than magnetic-field coupling which occurs between the intermediate portions 1323 and 1333.

Note that electric-field coupling may be dominant at the distributed constant line resonators 131 and 134 and that magnetic-field coupling may be dominant at the distributed constant line resonators 132 and 133.

The input/output terminals P11 and P12 are electrically connected to the end portions 1312 and 1342, respectively. A signal input to the input/output terminal P11 is output from the input/output terminal P12. A signal input to the input/output terminal P12 is output from the input/output terminal P11. Note that cases where two circuit elements are electrically connected include a case where the two circuit elements are directly connected and a case where the two circuit elements are coupled by electric-field coupling. In the distributed constant filter 1, the input/output terminals P11 and P12 respectively face the end portions 1312 and 1342 in the Z-axis direction and are respectively coupled, by electric-field coupling, to the end portions 1312 and 1342.

The end portions 1311 and 1322 face each other in the Y-axis direction and are coupled by electric-field coupling. The end portions 1341 and 1332 face each other in the Y-axis direction and are coupled by electric-field coupling.

Figure 5:
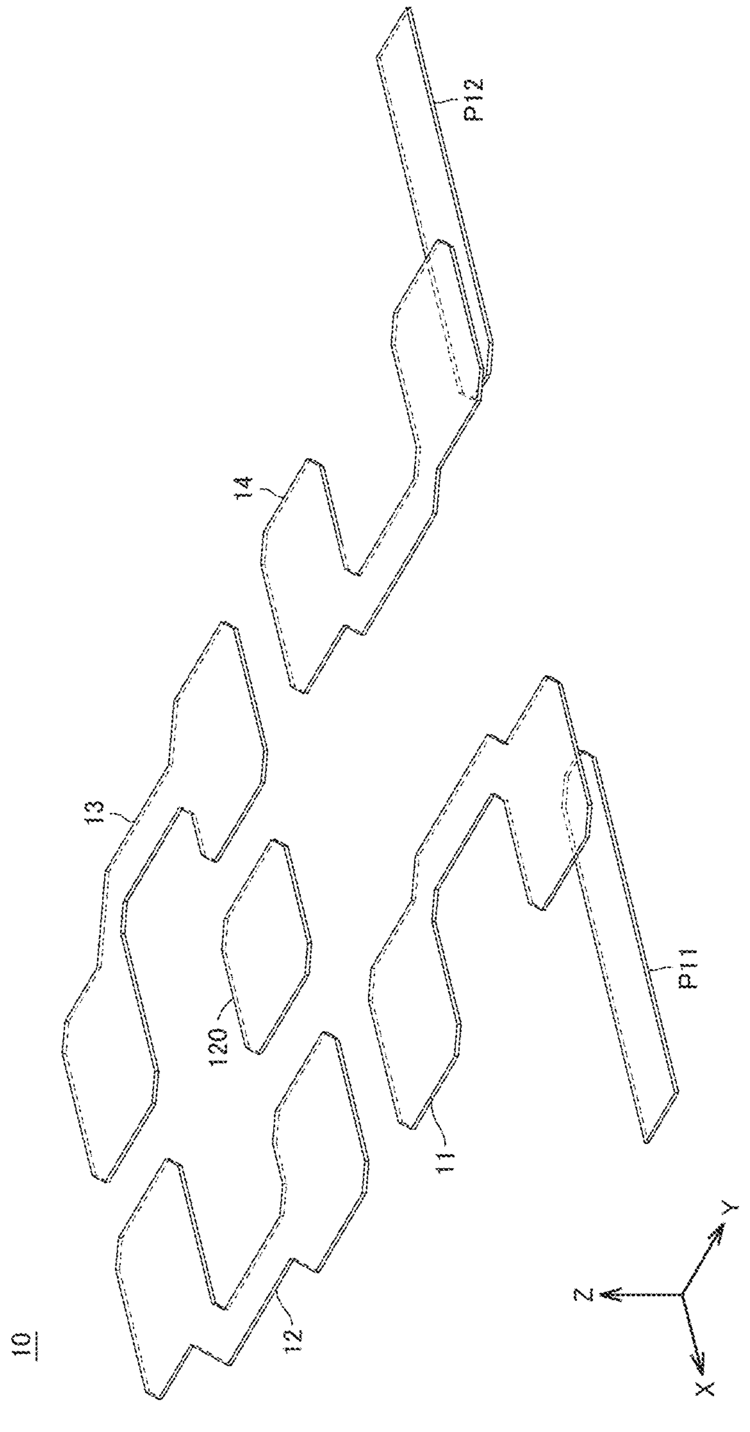
FIG. 5 is a perspective view of an interior of a dielectric substrate of a distributed constant filter according to a first comparative example of the first embodiment.

FIG. 5 is a perspective view of an interior of a dielectric substrate of a distributed constant filter 10 according to a first comparative example of the first embodiment. A configuration of the distributed constant filter 10 is one in which the distributed constant line resonators 131 to 134 in FIG. 4 are respectively replaced with distributed constant line resonators 11 to 14. Since other components are the same, a description thereof will not be repeated. As shown in FIG. 5, each of the distributed constant line resonators 11 to 14 is composed of one distributed constant line.

Figure 6:
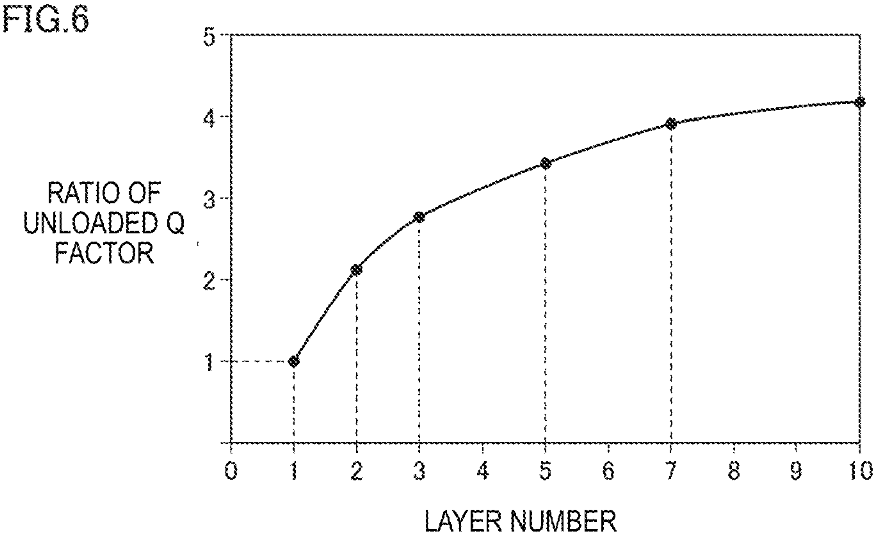
FIG. 6 is a graph showing a relationship between the number (a layer number) of distributed constant lines arranged in layers in a distributed constant line resonator and a ratio of an unloaded Q factor which is an indicator of sharpness of the distributed constant line resonator.

FIG. 6 is a graph showing a relationship between the number (a layer number) of distributed constant lines arranged in layers in a distributed constant line resonator and a ratio of an unloaded Q factor which is an indicator of sharpness of the distributed constant line resonator. In FIG. 6, a ratio of an unloaded Q factor corresponding to each layer number in a case where an unloaded Q factor of the distributed constant line resonator 11 shown in FIG. 5 is set at 1 is shown. A ratio of an unloaded Q factor corresponding to a layer number of 5 is a ratio of an unloaded Q factor of the distributed constant line resonator 131 shown in FIG. 4. As shown in FIG. 6, an unloaded Q factor of a distributed constant line resonator increases with increase in layer number.

Figure 7:
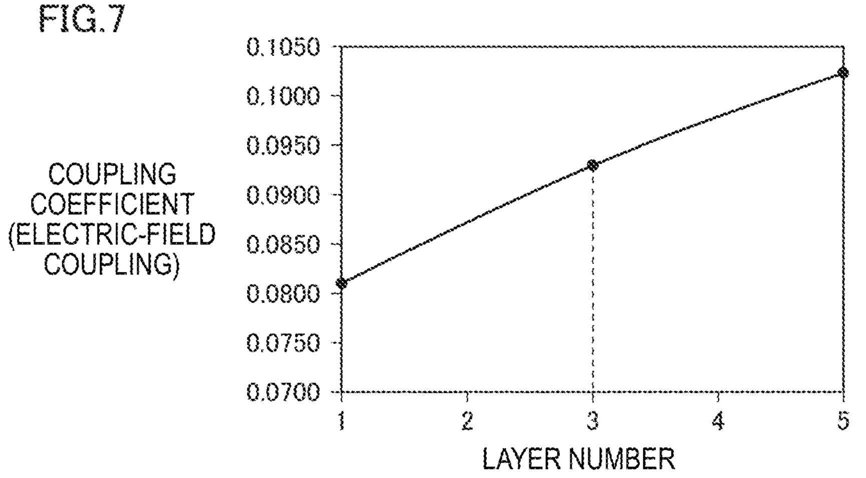
FIG. 7 is a graph showing a relationship between a layer number and a coupling coefficient for electric-field coupling.

FIG. 7 is a graph showing a relationship between a layer number and a coupling coefficient for electric-field coupling. A coupling coefficient corresponding to a layer number of 1 in FIG. 7 is a coupling coefficient of electric-field coupling between the distributed constant line resonators 11 and 12 shown in FIG. 5, and a coupling coefficient corresponding to a layer number of 5 is a coupling coefficient of electric-field coupling between the distributed constant line resonators 131 and 132 shown in FIG. 4. As shown in FIG. 7, a coupling coefficient of electric-field coupling between distributed constant line resonators increases with increase in layer number.

Figure 8:
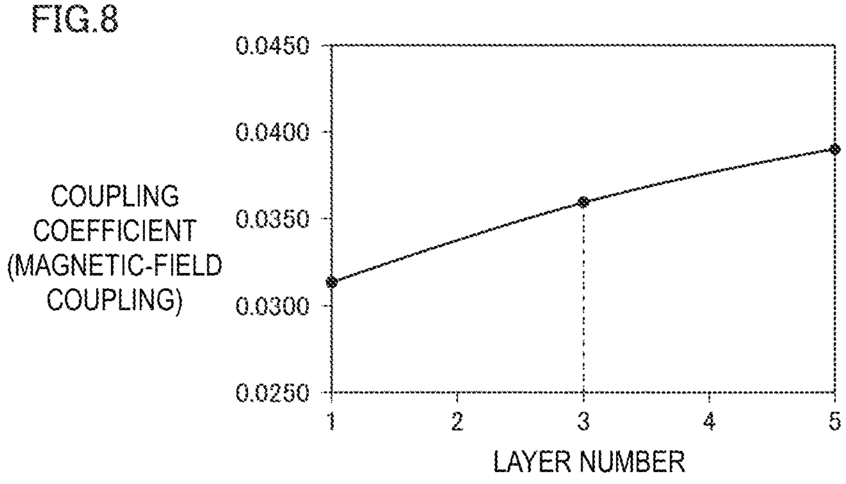
FIG. 8 is a graph showing a relationship between a layer number and a coupling coefficient for magnetic-field coupling.

FIG. 8 is a graph showing a relationship between a layer number and a coupling coefficient for magnetic-field coupling. A coupling coefficient corresponding to a layer number of 1 in FIG. 8 is a coupling coefficient of magnetic-field coupling between the distributed constant line resonators 11 and 14 shown in FIG. 5, and a coupling coefficient corresponding to a layer number of 5 is a coupling coefficient of electric-field coupling between the distributed constant line resonators 131 and 134 shown in FIG. 4. As shown in FIG. 8, a coupling coefficient of magnetic-field coupling between distributed constant line resonators increases with increase in layer number.

Figure 9:
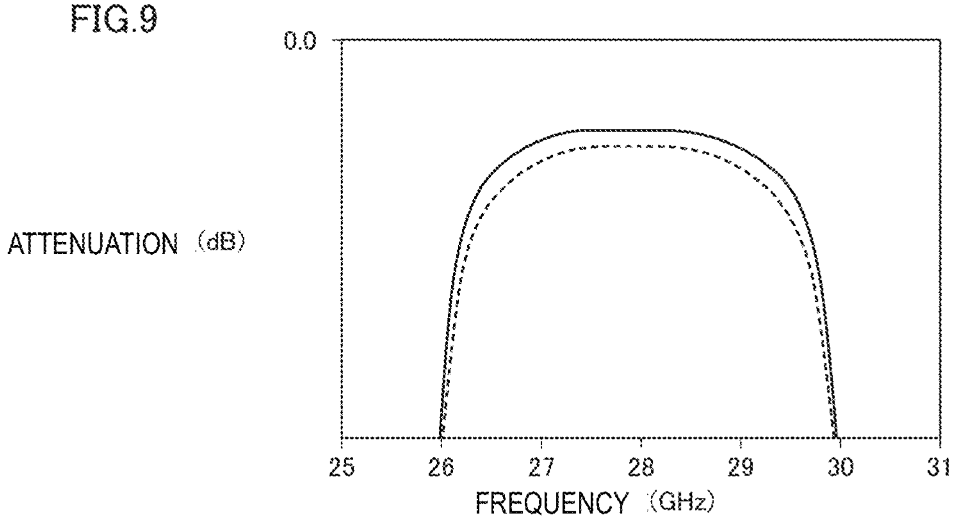
FIG. 9 is a graph showing a combination of bandpass characteristics (a solid line) of the distributed constant filter in FIG. 4 and bandpass characteristics (a dotted line) of the distributed constant filter in FIG. 5.

FIG. 9 is a graph showing a combination of bandpass characteristics (a solid line) of the distributed constant filter 1 in FIG. 4 and bandpass characteristics (a dotted line) of the distributed constant filter 10 in FIG. 5. Bandpass characteristics are insertion loss-frequency characteristics. An attenuation along the axis of ordinates in FIG. 9 increases from 0 dB in a downward direction. The same applies to FIG. 12 (to be described later). As shown in FIG. 9, an insertion loss of the distributed constant filter 1 is smaller than an insertion loss of the distributed constant filter 10 in a frequency band of 26 GHz to 30 GHz. In the distributed constant filter 1, a multilayer structure of a plurality of distributed constant lines increases an unloaded Q factor of each distributed constant line resonator, which results in achievement of reduction in loss.

As for the distributed constant filter 1, a case where the respective layer numbers of the distributed constant line resonators 131 to 134 are equal has been described. The respective layer numbers of the distributed constant line resonators 131 to 134 may be different.

Figure 10:
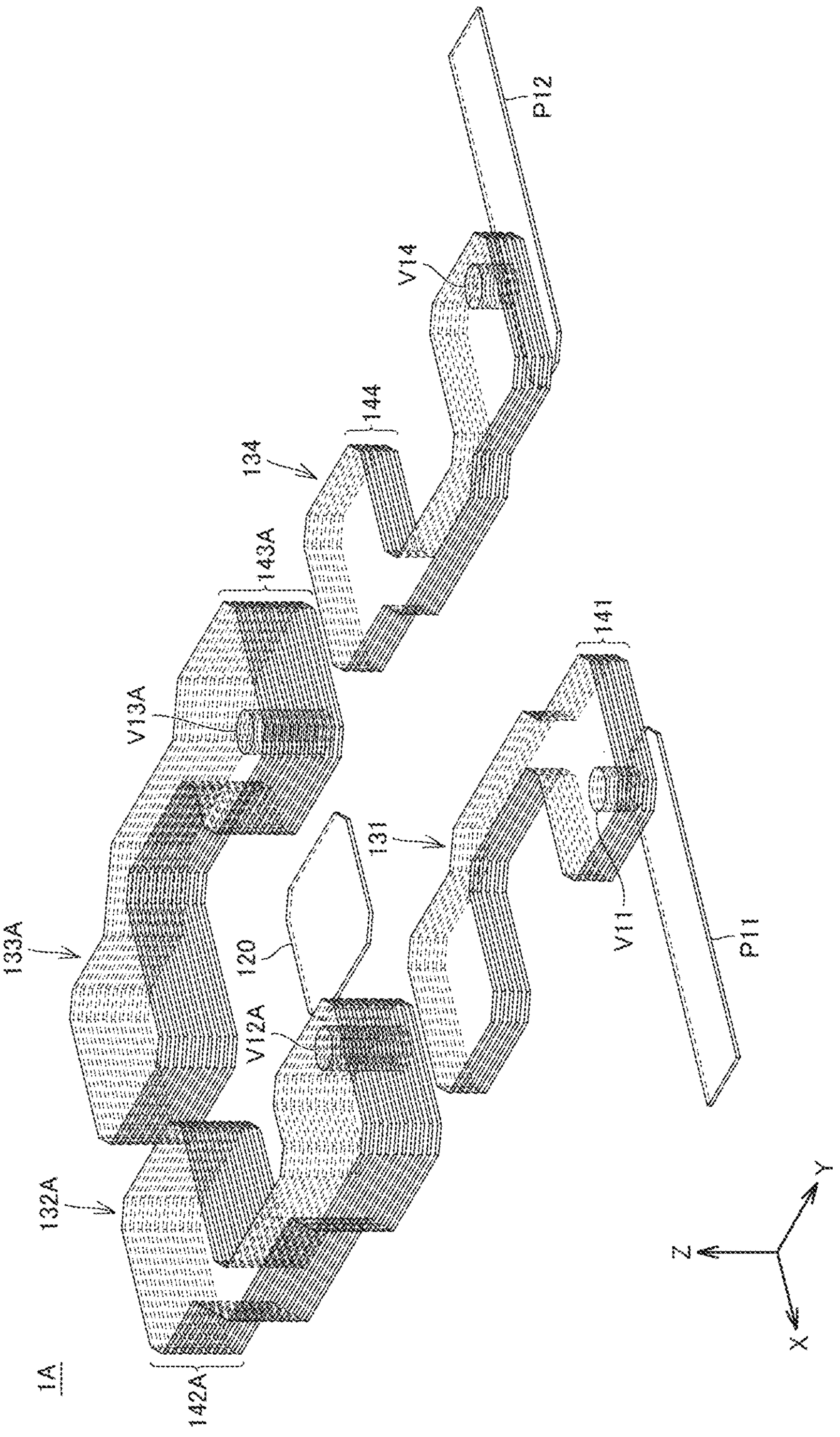
FIG. 10 is a perspective view of electrodes inside a dielectric substrate of a distributed constant filter according to a first modification of the first embodiment.

FIG. 10 is a perspective view of electrodes inside a dielectric substrate of a distributed constant filter 1A according to a first modification of the first embodiment. A configuration of the distributed constant filter 1A is one in which the distributed constant line resonators 132 and 133 in FIG. 4 are respectively replaced with a distributed constant line resonator 132A (a third resonator) and a distributed constant line resonator 133A (a fourth resonator). A configuration of the distributed constant line resonator 132A is one in which the plurality of distributed constant lines 142 and the via conductor V12 in FIG. 4 are respectively replaced with a plurality of distributed constant lines 142A and a via conductor V12A. A configuration of the distributed constant line resonator 133A is one in which the plurality of distributed constant lines 143 and the via conductor V13 in FIG. 4 are respectively replaced with a plurality of distributed constant lines 143A and a via conductor V13A. Since other components are the same, a description thereof will not be repeated.

As shown in FIG. 10, respective layer numbers of the plurality of distributed constant lines 142A and the plurality of distributed constant lines 143A are ten, and respective layer numbers of the plurality of distributed constant lines 141 and the plurality of distributed constant lines 144 are five. Respective unloaded Q factors of the distributed constant line resonators 132A and 133A are more than respective unloaded Q factors of the distributed constant line resonators 131 and 134.

Figure 11:
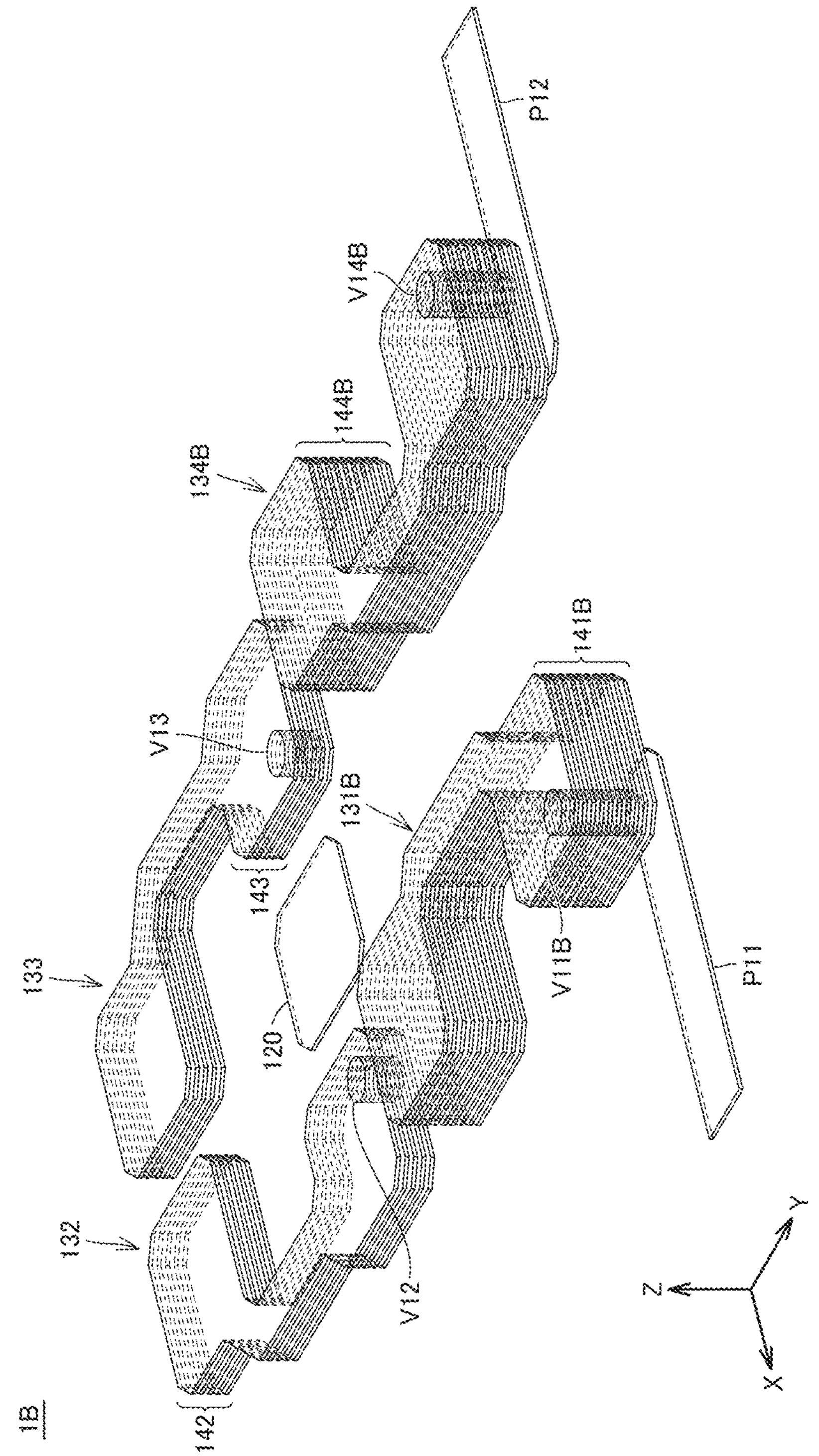
FIG. 11 is a perspective view of electrodes inside a dielectric substrate of a distributed constant filter according to a second modification of the first embodiment.

FIG. 11 is a perspective view of electrodes inside a dielectric substrate of a distributed constant filter 1B according to a second modification of the first embodiment. A configuration of the distributed constant filter 1B is one in which the distributed constant line resonators 131 and 134 in FIG. 4 are respectively replaced with a distributed constant line resonator 131B (a first resonator) and a distributed constant line resonator 134B (a second resonator). A configuration of the distributed constant line resonator 131B is one in which the plurality of distributed constant lines 141 and the via conductor V11 in FIG. 4 are respectively replaced with a plurality of distributed constant lines 141B and a via conductor V11B. A configuration of the distributed constant line resonator 134B is one in which the plurality of distributed constant lines 144 and the via conductor V14 in FIG. 4 are respectively replaced with a plurality of distributed constant lines 144B and a via conductor V14B. Since other components are the same, a description thereof will not be repeated.

As shown in FIG. 11, respective layer numbers of the plurality of distributed constant lines 141B and the plurality of distributed constant lines 144B are ten, and respective layer numbers of the plurality of distributed constant lines 142 and the plurality of distributed constant lines 143 are five. Respective unloaded Q factors of the distributed constant line resonators 131B and 134B are more than respective unloaded Q factors of the distributed constant line resonators 132 and 133.

Figure 12:
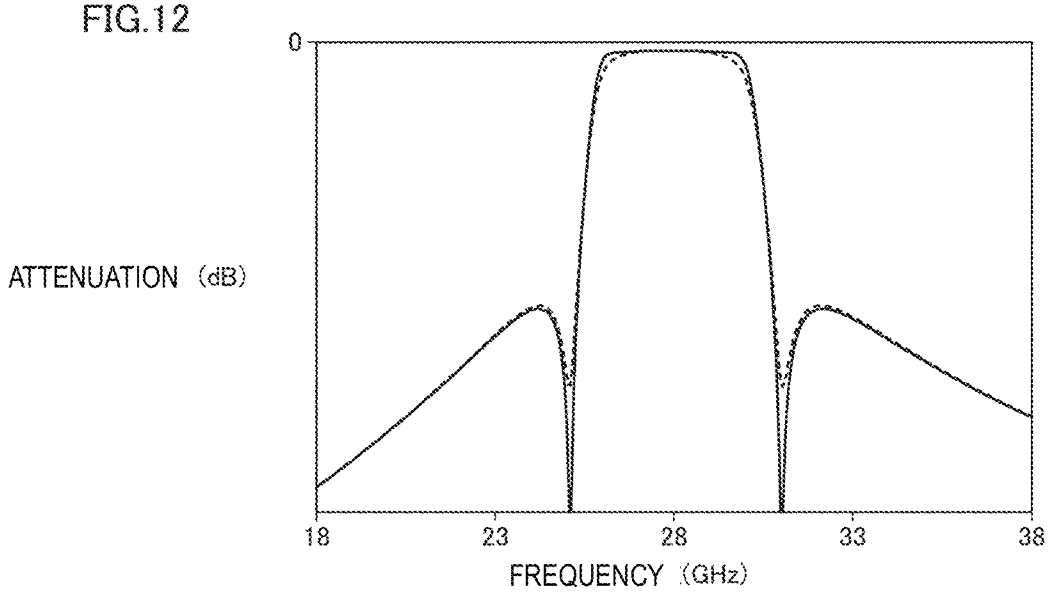
FIG. 12 is a graph showing a combination of bandpass characteristics (a solid line) of the distributed constant filter in FIG. 10 and bandpass characteristics (a dotted line) of the distributed constant filter in FIG. 11.

FIG. 12 is a graph showing a combination of bandpass characteristics (a solid line) of the distributed constant filter 1A in FIG. 10 and bandpass characteristics (a dotted line) of the distributed constant filter 1B in FIG. 11. As shown in FIG. 12, an insertion loss of the distributed constant filter 1A is smaller than an insertion loss of the distributed constant filter 1B in pass bands. Outside the pass bands, attenuations at attenuation poles of the distributed constant filter 1A are larger than attenuations at attenuation poles of the distributed constant filter 1B. For this reason, a change in insertion loss from a pass band toward outside the pass band is sharper in the distributed constant filter 1A than in the distributed constant filter 1B. As a result, a signal filtering function of allowing a signal in the pass band to pass through and not allowing a signal outside the pass band to pass through in the distributed constant filter 1A is enhanced as compared with that in the distributed constant filter 1B.

Performance of a distributed constant filter can be improved by increasing unloaded Q factors of two distributed constant line resonators coupled, by electric-field coupling, to two distributed constant line resonators electrically connected to the input/output terminals P11 and P12, respectively, rather than the two distributed constant line resonators.

As for the distributed constant filter 1A, a case where respective layer numbers in the distributed constant line resonators 131 and 134 are equal and respective layer numbers in the distributed constant line resonators 132A and 133A are equal has been described. The respective layer numbers in the distributed constant line resonators 131 and 134 may be different. The respective layer numbers in the distributed constant line resonators 132A and 133A may also be different.

Figure 13:
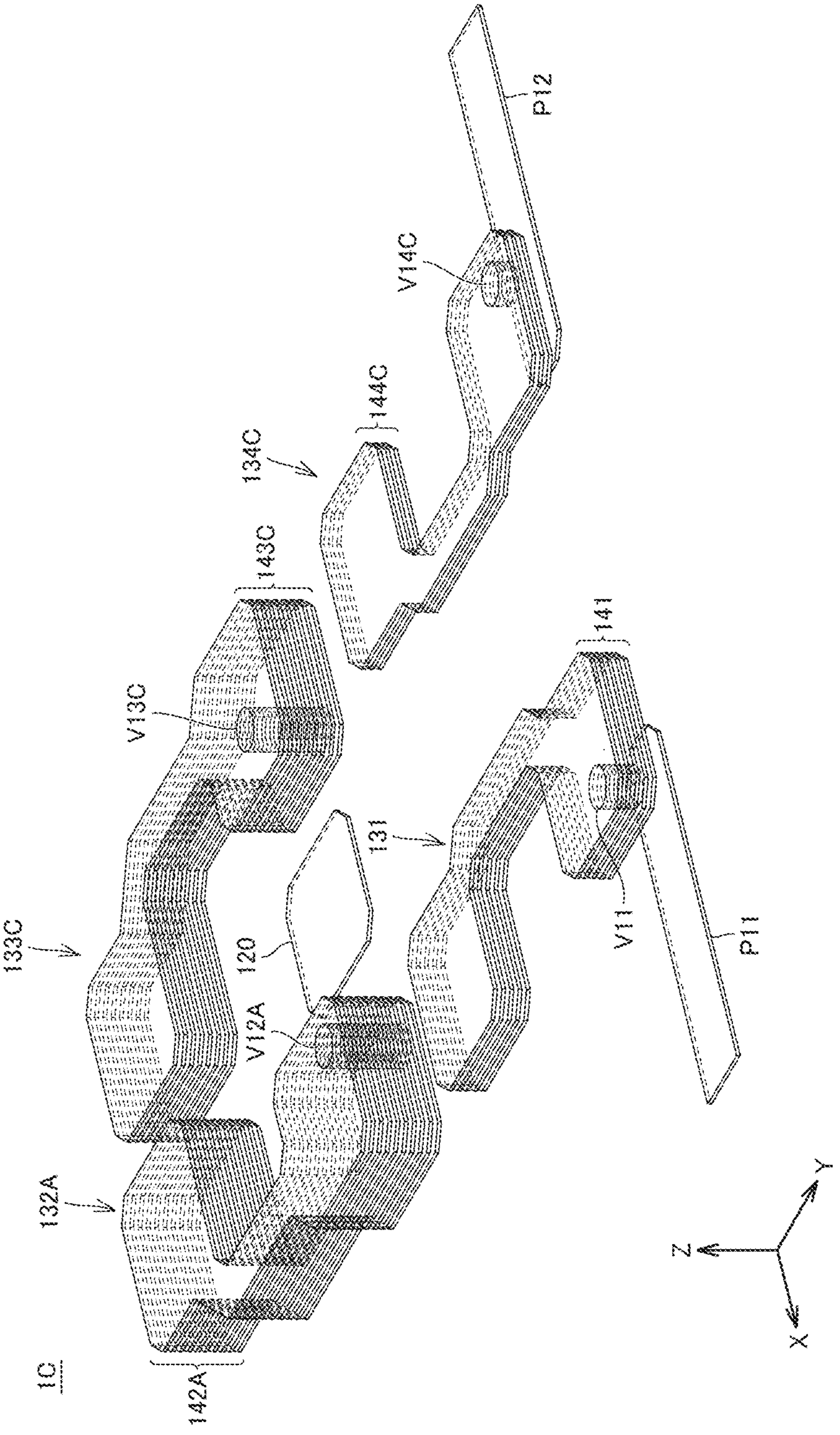
FIG. 13 is a perspective view of electrodes inside a dielectric substrate of a distributed constant filter according to a third modification of the first embodiment.

FIG. 13 is a perspective view of electrodes inside a dielectric substrate of a distributed constant filter 1C according to a third modification of the first embodiment. A configuration of the distributed constant filter 1C is one in which the distributed constant line resonators 133A and 134 in FIG. 10 are respectively replaced with a distributed constant line resonator 133C (a first resonator) and a distributed constant line resonator 134C (a second resonator). A configuration of the distributed constant line resonator 133C is one in which the plurality of distributed constant lines 143A and the via conductor V13A in FIG. 10 are respectively replaced with a plurality of distributed constant lines 143C and a via conductor V13C. A configuration of the distributed constant line resonator 134C is one in which the plurality of distributed constant lines 144 and the via conductor V14 in FIG. 10 are respectively replaced with a plurality of distributed constant lines 144C and a via conductor V14C. Since other components are the same, a description thereof will not be repeated.

As shown in FIG. 13, a layer number of the plurality of distributed constant lines 143C is eight, and a layer number of the plurality of distributed constant lines 144C is three. Respective layer numbers in the distributed constant line resonators 131 and 134C are different. Respective layer numbers in the distributed constant line resonators 132 and 133C are also different.

Respective layer numbers in a plurality of distributed constant line resonators included in a distributed constant filter can be appropriately determined in accordance with manufacturing cost restriction, design region restriction, or desired characteristics. Reduction in layer number allows reduction in manufacturing cost of and manufacturing variation between distributed constant filters. Since distributed constant line resonators with reduced layer numbers have reduced thicknesses, the degrees of freedom in the layout of distributed constant line resonators can be improved.

As for the distributed constant filter 1, a case where each of the distributed constant line resonators 131 to 134 is a strip line has been described. Each of the distributed constant line resonators 131 to 134 may be a microstrip line which faces a ground electrode on one side in the Z-axis direction.

Figure 14:
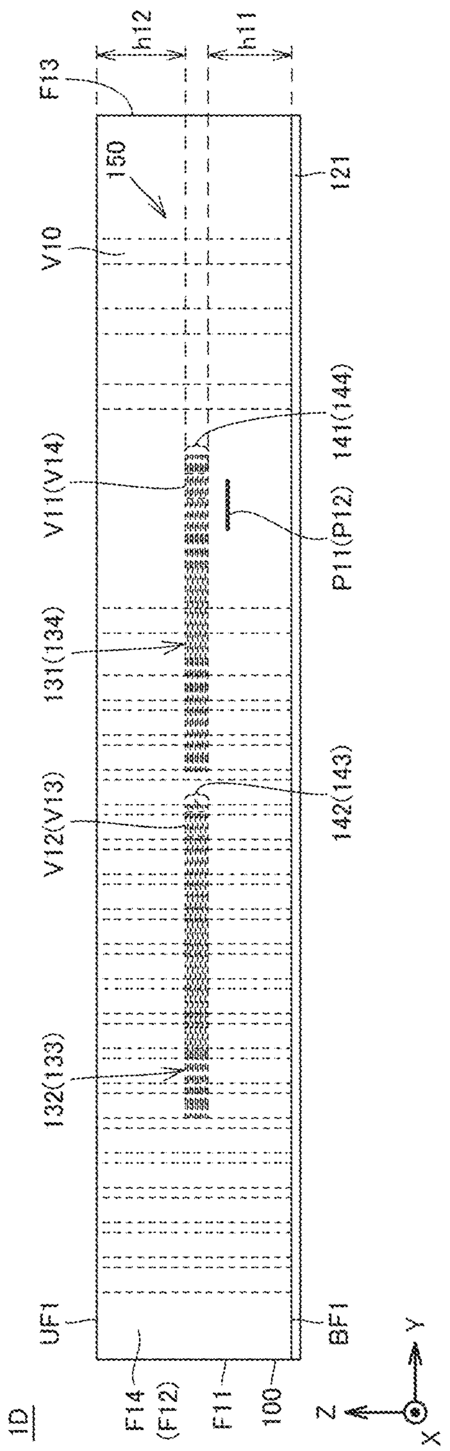
FIG. 14 is a view of a distributed constant filter according to a fourth modification of the first embodiment as viewed in plan view from a Y-axis direction.

FIG. 14 is a view of a distributed constant filter 1D according to a fourth modification of the first embodiment as viewed in plan view from a Y-axis direction. A configuration of the distributed constant filter 1D is one in which the ground electrode 122 is removed from the distributed constant filter 1 in FIG. 3. The distributed constant filter 1D may have a configuration in which the ground electrode 121 is removed from the distributed constant filter 1. The distributed constant filter 1D may have a configuration in which the plurality of via conductors V10 and the ground electrode 121 or 122 are removed from the distributed constant filter 1.

Note that a distance h11 between each of the distributed constant line resonators 131 to 134 and the bottom surface BF1 and a distance h12 between each of the distributed constant line resonators 131 to 134 and the upper surface UF1 may be equal or different. A permittivity of dielectric layers at which the distributed constant line resonators 131 to 134 are formed and a permittivity of dielectric layers at which the distributed constant line resonators 131 to 134 are not formed may be equal or different.

As described above, distributed constant filters according to the first embodiment and the first to fourth modifications allow reduction in degradation of characteristics of a distributed constant filter due to manufacturing variation between distributed constant line resonators.

The first embodiment has described a case including four distributed constant line resonators. The number of distributed constant line resonators which a distributed constant filter according to an embodiment includes is not limited to four. A distributed constant filter including two distributed constant line resonators will be described below.

Second Embodiment

Figure 15:
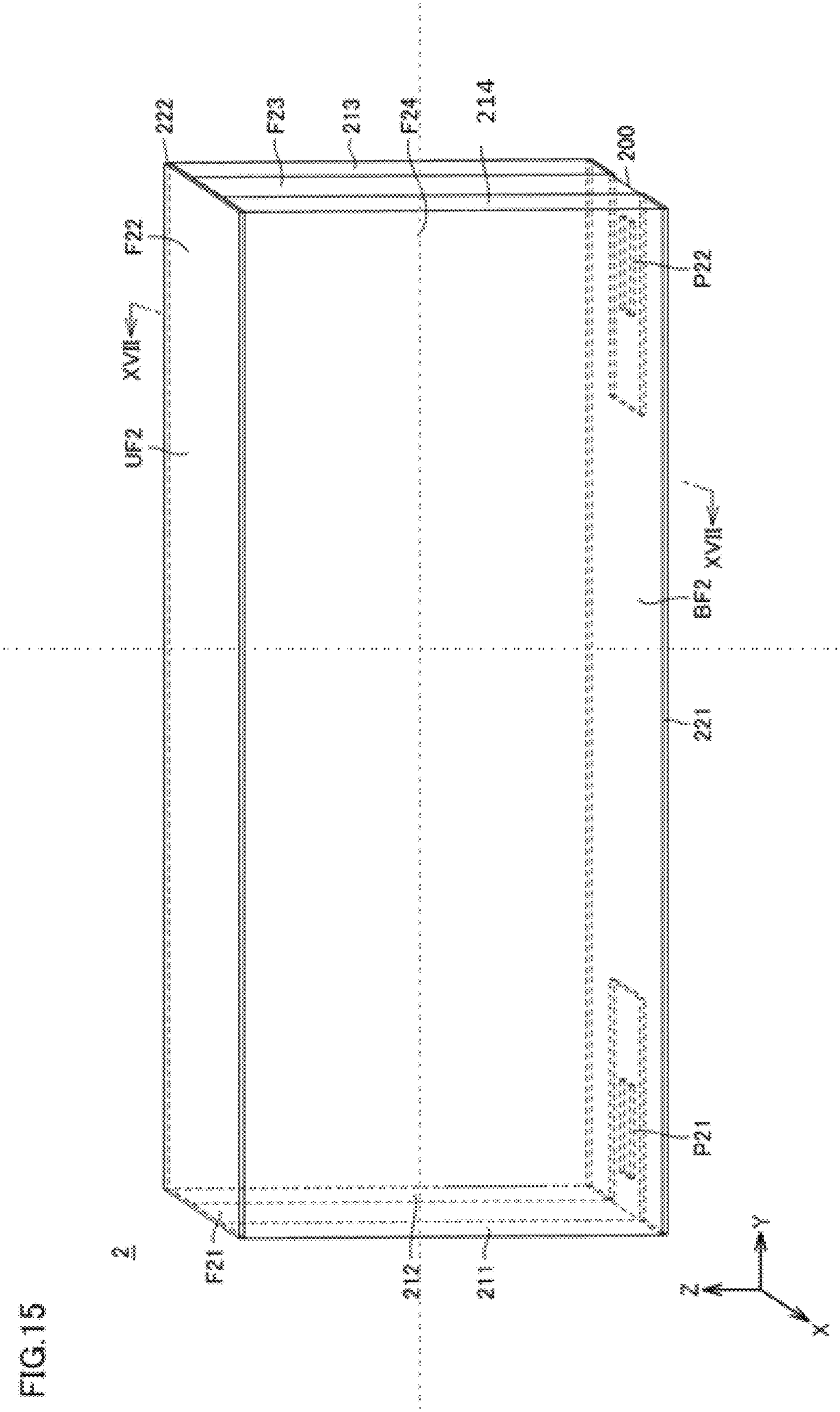
FIG. 15 is an external perspective view of a distributed constant filter according to a second embodiment.
Figure 16:
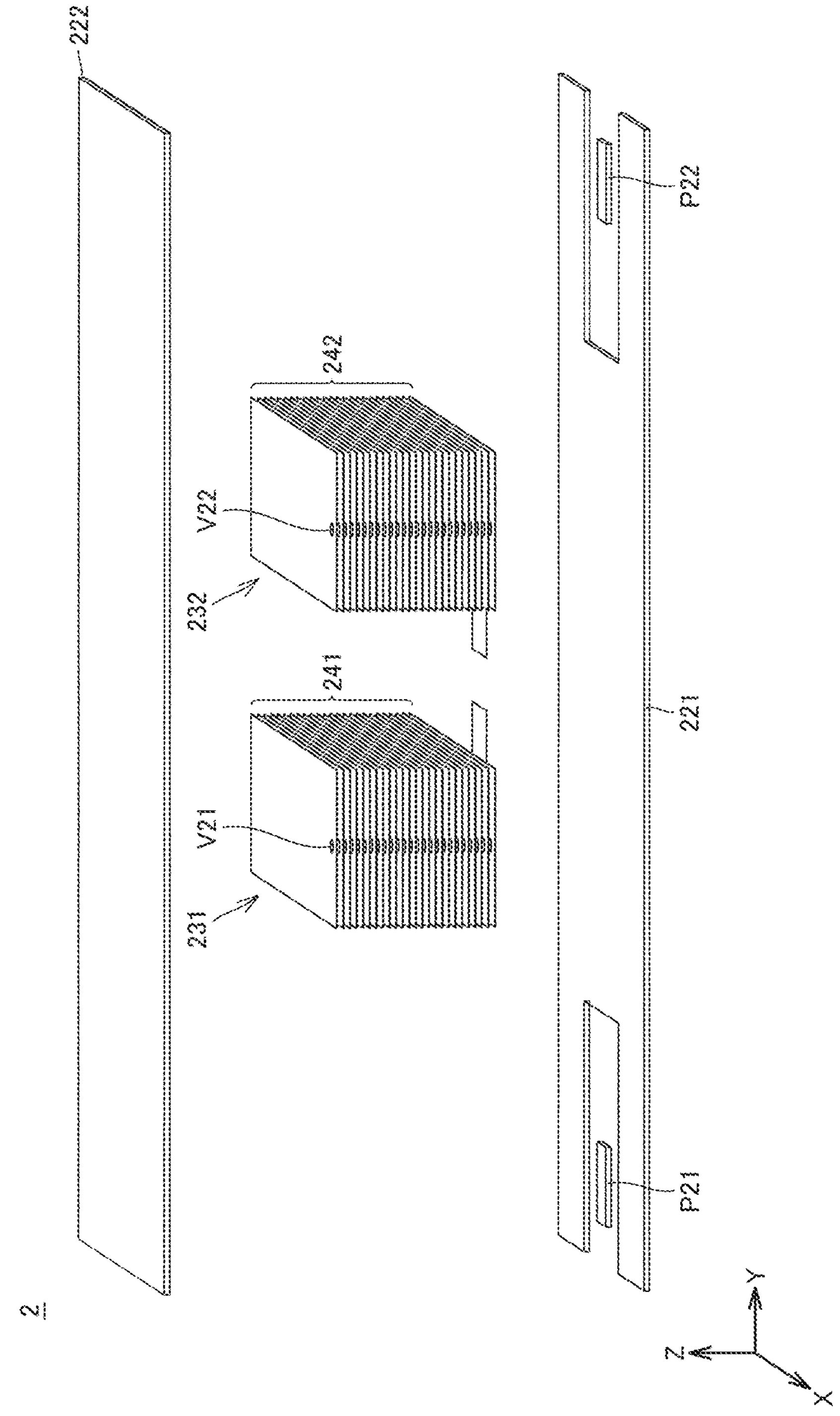
FIG. 16 is a perspective view of the distributed constant filter according to the second embodiment.
Figure 17:
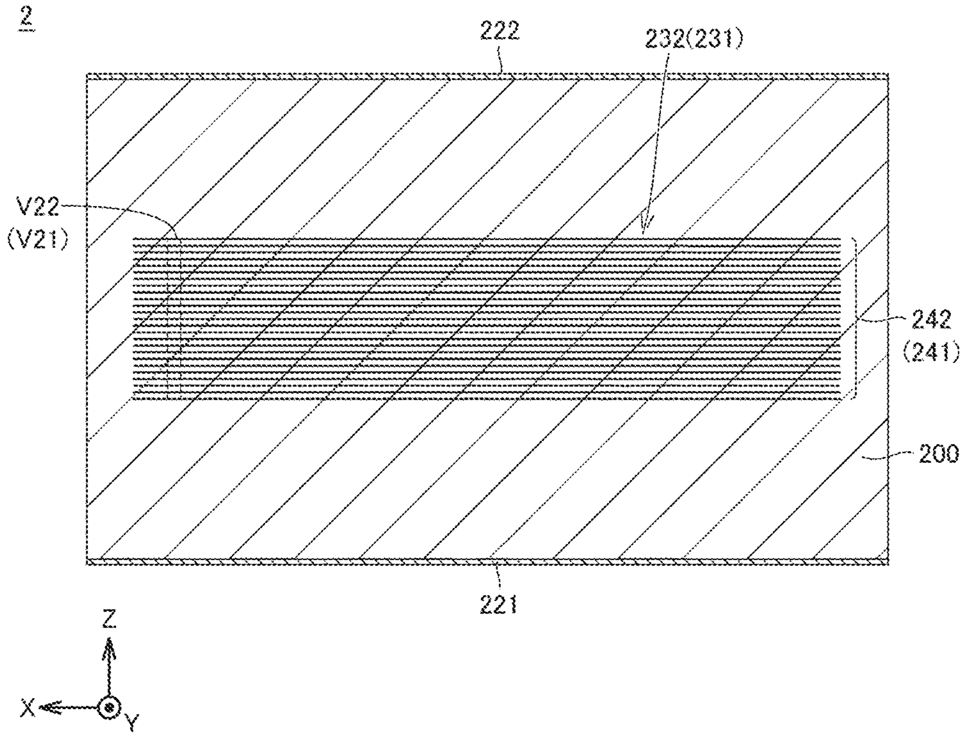
FIG. 17 is a sectional view taken along line XVII-XVII in FIG. 15.

FIGS. 15 and 16 are perspective views of a distributed constant filter 2 according to a second embodiment. FIG. 17 is a sectional view taken along line XVII-XVII in FIG. 15. Referring to FIGS. 15 to 17, the distributed constant filter 2 has the shape of, for example, a rectangular parallelepiped. The distributed constant filter 2 includes a dielectric substrate 200, distributed constant line resonators 231 and 232, a ground electrode 221 (a first ground electrode), a ground electrode 222 (a second ground electrode), ground electrodes 211 to 214, an input/output terminal P21 (a first terminal), and an input/output terminal P22 (a second terminal). Note that the dielectric substrate 200 in FIG. 15 is not shown in FIG. 16 for visibility of the distributed constant line resonators 231 and 232 that are formed inside the distributed constant filter 2. As for omission of the dielectric substrate 200, the same applies to FIGS. 18 and 23.

The dielectric substrate 200 is formed from a plurality of dielectric layers stacked in a Z-axis direction (a first direction). Each of the distributed constant line resonators 231 and 232 extends in an X-axis direction (a second direction) inside the dielectric substrate 200. A length in the X-axis direction, a length in a Y-axis direction, and a length in the Z-axis direction of the distributed constant line resonator 231 are the same as a length in the X-axis direction, a length in the Y-axis direction, and a length in the Z-axis direction, respectively, of the distributed constant line resonator 232. The distributed constant line resonators 231 and 232 are juxtaposed in this order in the Y-axis direction (a third direction) between the ground electrodes 221 and 222.

The input/output terminals P21 and P22 are electrically connected to the distributed constant line resonators 231 and 232, respectively, through a via conductor and a line conductor (not shown). A signal input to the input/output terminal P21 is output from the input/output terminal P22. A signal input to the input/output terminal P22 is output from the input/output terminal P21.

Surfaces at outermost layers of the distributed constant filter 2 perpendicular to the Z-axis direction will be referred to as an upper surface UF2 and a bottom surface BF2. The upper surface UF2 and the bottom surface BF2 face the Z-axis direction. Of surfaces parallel to the Z-axis direction, surfaces parallel to a ZX plane will be referred to as side surfaces F21 and F23. Of the surfaces parallel to the Z-axis direction, surfaces parallel to a YZ plane will be referred to as side surfaces F22 and F24.

The input/output terminals P21 and P22 and the ground electrode 221 are formed on the bottom surface BF2. The input/output terminals P21 and P22 and the ground electrode 221 are, for example, land grid array (LGA) terminals obtained by regularly arranging planar electrodes on the bottom surface BF2. The bottom surface BF2 is connected to a circuit board (not shown).

The ground electrode 222 is arranged on the upper surface UF2. The ground electrode 222 covers the upper surface UF2.

The ground electrodes 211 and 212 are arranged on the side surface F21. The ground electrodes 211 and 212 are spaced apart from each other in the X-axis direction. Each of the ground electrodes 211 and 212 is connected to the ground electrodes 221 and 222.

The ground electrodes 213 and 214 are arranged on the side surface F23. The ground electrodes 213 and 214 are spaced apart from each other in the X-axis direction. Each of the ground electrodes 213 and 214 is connected to the ground electrodes 221 and 222. No ground electrodes are formed on the side surfaces F22 and F24.

Both end portions of each of the distributed constant line resonators 231 and 232 are open ends where voltages can change. A length in the X-axis direction of each of the distributed constant line resonators 231 and 232 is one-half of a wavelength of a desired signal which can pass through the distributed constant filter 2. That is, each of the distributed constant line resonators 231 and 232 is a λ/2 resonator. The distributed constant filter 2 is a two-stage distributed constant filter which is formed from two λ/2 resonators. A stage number of the distributed constant filter 2 may be three or more.

The distributed constant line resonators 231 and 232 respectively include a plurality of distributed constant lines 241 and a plurality of distributed constant lines 242. Each of the plurality of distributed constant lines 241 forms a distributed constant line which extends in the X-axis direction and has a normal line in the Z-axis direction. Each of the plurality of distributed constant lines 241 is arranged at any of a plurality of dielectric layers forming the dielectric substrate 200. That is, the plurality of distributed constant lines 241 are arranged in layers at spacings corresponding to a thickness of a dielectric layer in the Z-axis direction. The spacing between conductors adjacent in the Z-axis direction need not be uniform in the plurality of distributed constant lines 241. The plurality of distributed constant lines 242 are arranged in the same manner as in the plurality of distributed constant lines 241.

The distributed constant line resonators 231 and 232 respectively include via conductors V21 and V22. At one end portion of the distributed constant line resonator 231, the plurality of distributed constant lines 241 are connected to each other by the via conductor V21. At one end portion of the distributed constant line resonator 232, the plurality of distributed constant lines 242 are connected to each other by the via conductor V22.

As described above, a distributed constant filter according to the second embodiment allows reduction in degradation of characteristics of a distributed constant filter due to manufacturing variation between distributed constant line resonators.

Third Embodiment

The second embodiment has described a case where widths of a plurality of distributed constant lines forming a distributed constant line resonator are uniform. When the plurality of distributed constant lines are viewed in plan view from a direction in which the distributed constant line resonator extends, the plurality of distributed constant lines form a rectangular shape on the whole. If a current flows through a distributed constant line resonator having a sharp corner portion like a rectangle, electric-field concentration is likely to occur at the corner portion. Electric-field concentration causes a conductor loss, which worsens an insertion loss of a distributed constant filter.

Under the circumstances, in a third embodiment, a width of a conductor close to an outermost layer is set shorter than a width of a conductor close to an intermediate layer in a plurality of distributed constant lines forming a distributed constant line resonator. When the plurality of distributed constant lines are viewed in plan view from a direction in which the distributed constant line resonator extends, the plurality of distributed constant lines form, on the whole, a shape obtained by rounding corner portions of a rectangle. Since the corner portions are not sharp in the shape, electric-field concentration is relieved. A distributed constant filter according to the third embodiment reduces a conductor loss. As a result, an insertion loss can be improved.

Figure 18:
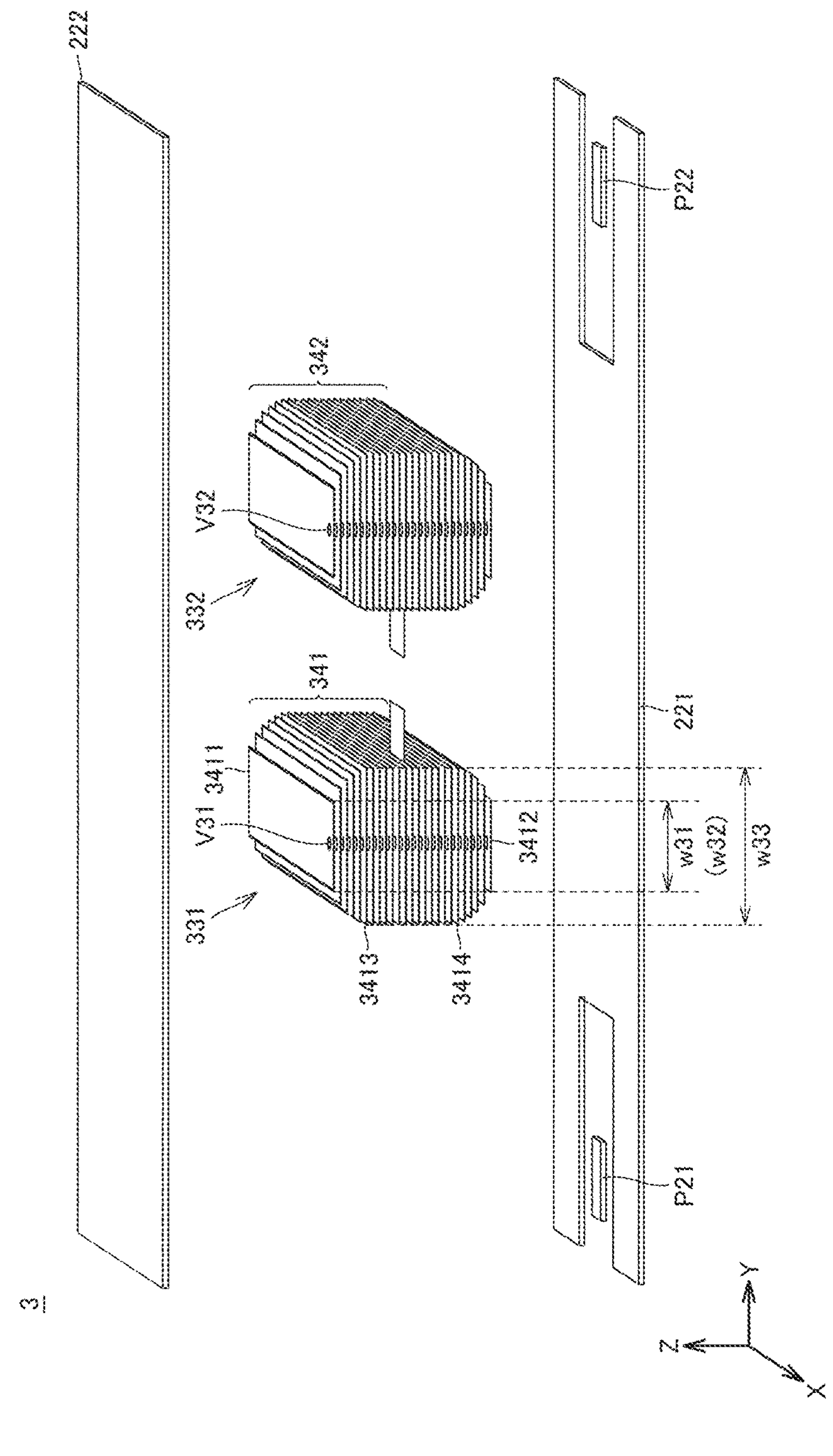
FIG. 18 is a perspective view of a distributed constant filter according to a third embodiment.

FIG. 18 is a perspective view of a distributed constant filter 3 according to the third embodiment. A configuration of the distributed constant filter 3 is one in which the distributed constant line resonators 231 and 232 in FIG. 16 are respectively replaced with distributed constant line resonators 331 and 332. Since other components are the same, a description thereof will not be repeated.

As shown in FIG. 18, the distributed constant line resonator 331 includes a plurality of distributed constant lines 341 and a via conductor V31. Each of the plurality of distributed constant lines 341 forms a distributed constant line which extends in an X-axis direction and has a normal line in a Z-axis direction.

Both end portions of the distributed constant line resonator 331 are open ends where voltages can change. At one end portion of the distributed constant line resonator 331, the plurality of distributed constant lines 341 are connected to each other by the via conductor V31.

The distributed constant line resonator 332 includes a plurality of distributed constant lines 342 and a via conductor V32. Each of the plurality of distributed constant lines 342 forms a distributed constant line which extends in the X-axis direction and has a normal line in the Z-axis direction.

Both end portions of the distributed constant line resonator 332 are open ends where voltages can change. At one end portion of the distributed constant line resonator 332, the plurality of distributed constant lines 342 are connected to each other by the via conductor V32.

A length in the X-axis direction of each of the distributed constant line resonators 331 and 332 is one-half of a wavelength of a desired signal which can pass through the distributed constant filter 3. That is, each of the distributed constant line resonators 331 and 332 is a λ/2 resonator. The distributed constant filter 3 is a two-stage distributed constant filter which is formed from two λ/2 resonators. A stage number of the distributed constant filter 3 may be three or more.

The plurality of distributed constant lines 341 and 342 have similar multilayer structures to each other. The multilayer structure of the plurality of distributed constant lines 341 will be described below.

The plurality of distributed constant lines 341 include a distributed constant line 3411 (a first distributed constant line), a distributed constant line 3412 (a second distributed constant line), a distributed constant line 3413 (a third distributed constant line), and a distributed constant line 3414 (a third distributed constant line). Of conductors included in the plurality of distributed constant lines 341, conductors other than the distributed constant lines 3411 and 3412 are arranged in layers between the distributed constant line 3411 and the distributed constant line 3412.

A width of the distributed constant line resonator 331 is a width w33 (a specified length). A width of each of the distributed constant lines 3413 and 3414 and conductors arranged in layers between the distributed constant lines 3413 and 3414 is also the width w33.

A width of the distributed constant line 3411 is a width w31 (<w33). A width of the distributed constant line 3412 is a width w32 (<w33). The widths w31 and w32 may be different or equal.

Widths of distributed constant lines arranged between the distributed constant line 3411 and the distributed constant line 3413 increase gradually in a direction from the distributed constant line 3411 toward the distributed constant line 3413. Widths of distributed constant lines arranged between the distributed constant line 3412 and the distributed constant line 3414 increase gradually in a direction from the distributed constant line 3412 toward the distributed constant line 3414.

Figure 19:
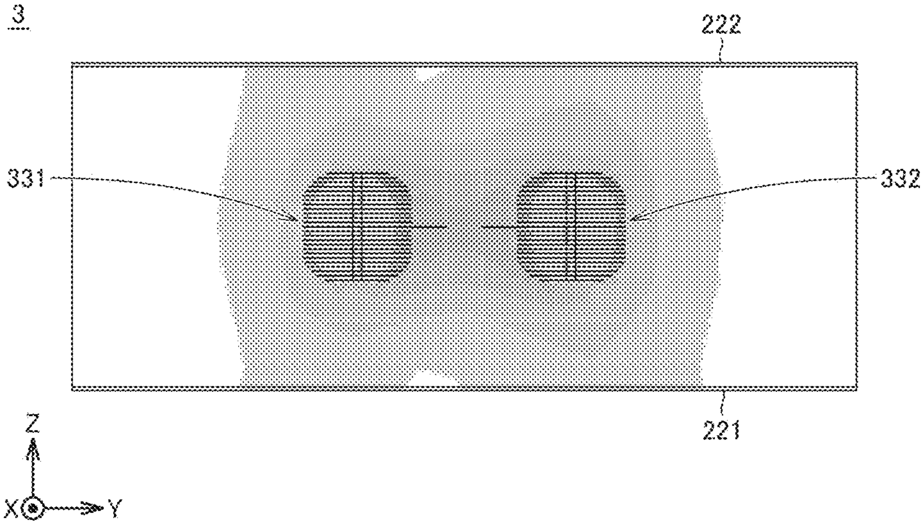
FIG. 19 is a view of a distribution of intensity of electric field in a simulation which feeds a radio frequency signal to distributed constant line resonators in FIG. 18 in odd mode, as viewed in plan view from an X-axis direction.
Figure 20:
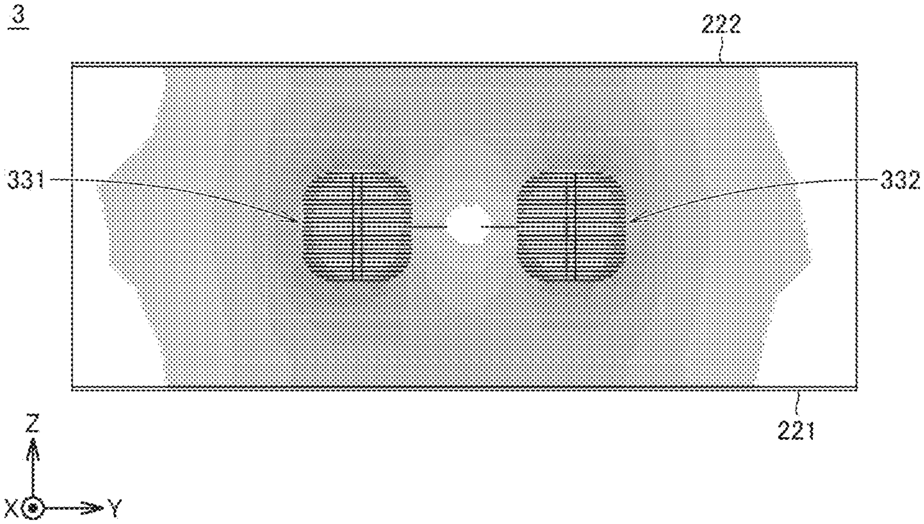
FIG. 20 is a view of a distribution of intensity of electric field in a simulation which feeds a radio frequency signal to the distributed constant line resonators in FIG. 18 in even mode, as viewed in plan view from the X-axis direction.

FIG. 19 is a view of a distribution of intensity of electric field in a simulation which feeds a radio frequency signal to the distributed constant line resonators 331 and 332 in FIG. 18 in odd mode, as viewed in plan view from an X-axis direction. FIG. 20 is a view of a distribution of intensity of electric field in a simulation which feeds a radio frequency signal to the distributed constant line resonators 331 and 332 in FIG. 18 in even mode, as viewed in plan view from the X-axis direction. In odd mode, directions of respective currents flowing through the distributed constant line resonators 331 and 332 are opposite. In even mode, directions of respective currents flowing through the distributed constant line resonators 331 and 332 are the same. As shown in FIGS. 19 and 20, the plurality of distributed constant lines included in each of the distributed constant line resonators 331 and 332 form, on the whole, a shape obtained by rounding corner portions of a rectangle.

Figure 21:
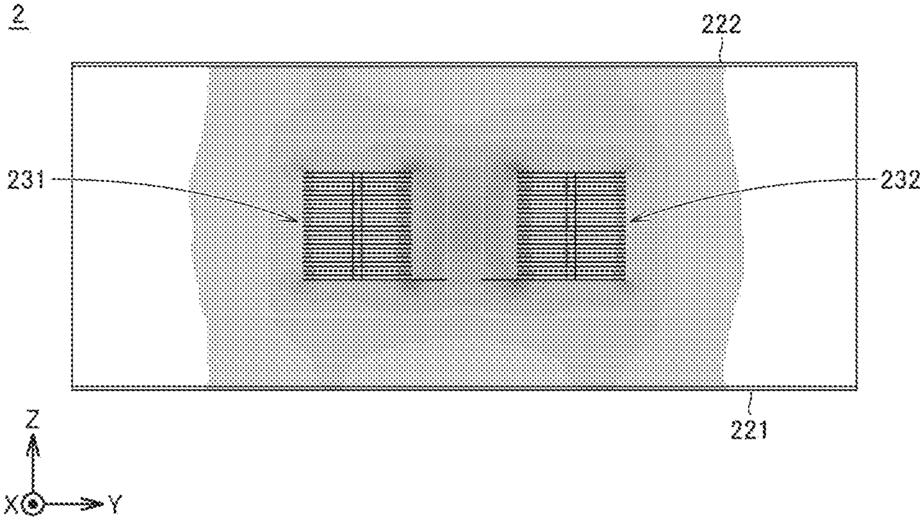
FIG. 21 is a view of a distribution of intensity of electric field in a simulation which feeds a radio frequency signal to distributed constant line resonators in FIG. 16 in odd mode, as viewed in plan view from an X-axis direction.
Figure 22:
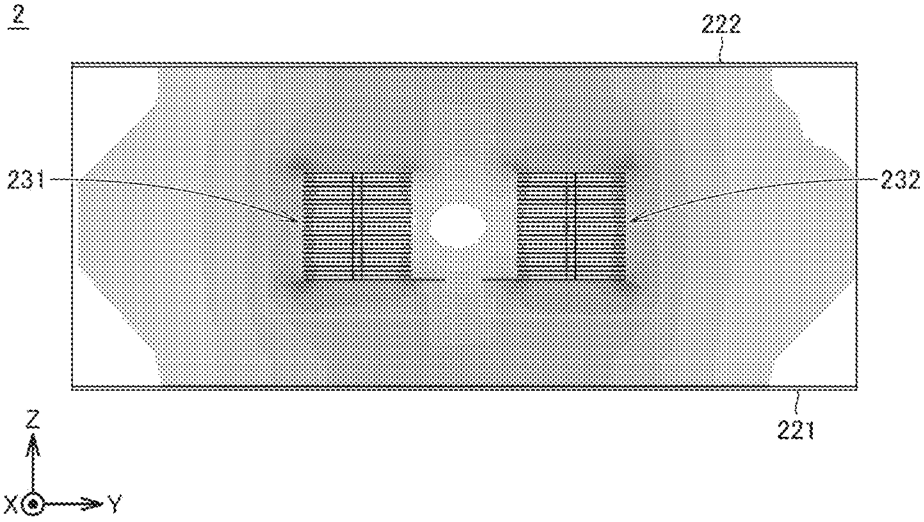
FIG. 22 is a view of a distribution of intensity of electric field in a simulation which feeds a radio frequency signal to the distributed constant line resonators in FIG. 16 in even mode, as viewed in plan view from the X-axis direction.

FIG. 21 is a view of a distribution of intensity of electric field in a simulation which feeds a radio frequency signal to the distributed constant line resonators 231 and 232 in FIG. 16 in odd mode, as viewed in plan view from an X-axis direction. FIG. 22 is a view of a distribution of intensity of electric field in a simulation which feeds a radio frequency signal to the distributed constant line resonators 231 and 232 in FIG. 16 in even mode, as viewed in plan view from the X-axis direction. As shown in FIGS. 21 and 22, the plurality of distributed constant lines included in each of the distributed constant line resonators 231 and 232 form a rectangular shape with sharp corner portions on the whole.

As for odd mode, FIGS. 19 and 21 will be compared. As for even mode, FIGS. 20 and 22 will be compared. While electric-field concentration occurs at both end portions of conductors at outermost layers of each of the distributed constant line resonators 231 and 232 in FIGS. 21 and 22, electric fields are dispersed at conductors at outermost layers of each of the distributed constant line resonators 331 and 332 in FIGS. 19 and 20. According to the distributed constant filter 3, relief of electric-field concentration reduces a conductor loss. As a result, an insertion loss can be further improved as compared with the distributed constant filter 2.

A shape which a plurality of distributed constant lines included in a distributed constant line resonators form on the whole may be a circular shape. Note that the circular shape need not be a perfect circle and includes an elliptical shape.

Figure 23:
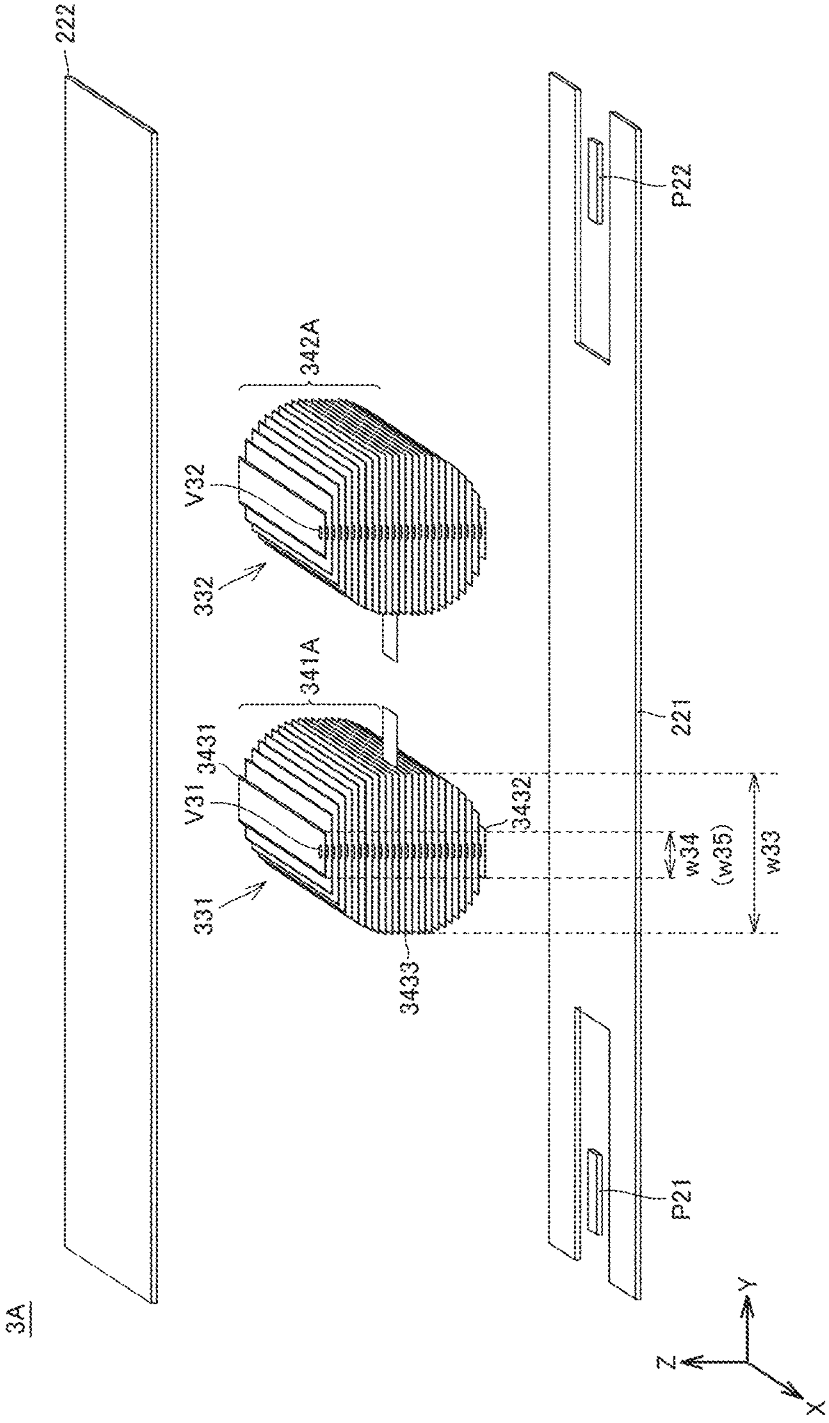
FIG. 23 is a perspective view of a distributed constant filter according to a modification of the third embodiment.

FIG. 23 is a perspective view of a distributed constant filter 3A according to a modification of the third embodiment. A configuration of the distributed constant filter 3A is one in which the plurality of distributed constant lines 341 and the plurality of distributed constant lines 342 in FIG. 18 are replaced with a plurality of distributed constant lines 341A and a plurality of distributed constant lines 342A. Since other components are the same, a description thereof will not be repeated.

As shown in FIG. 23, when the plurality of distributed constant lines 341A and the plurality of distributed constant lines 342A are viewed in plan view from an X-axis direction, each of the plurality of distributed constant lines 341A and the plurality of distributed constant lines 342A forms a circular shape on the whole.

The plurality of distributed constant lines 341A include a distributed constant line 3431 (a first distributed constant line), a distributed constant line 3432 (a second distributed constant line), and a distributed constant line 3433 (a third distributed constant line). Of conductors included in the plurality of distributed constant lines 341A, conductors other than the distributed constant lines 3431 and 3432 are arranged in layers between the distributed constant line 3431 and the distributed constant line 3432.

A width of the distributed constant line 3433 is the width w33. A width of the distributed constant line 3431 is a width w34 (<w33). A width of the distributed constant line 3432 is a width w35 (<w33). The widths w34 and w35 may be different or equal.

Widths of conductors arranged between the distributed constant line 3431 and the distributed constant line 3433 increase gradually in a direction from the distributed constant line 3431 toward the distributed constant line 3433. Widths of conductors arranged between the distributed constant line 3432 and the distributed constant line 3433 increase gradually in a direction from the distributed constant line 3432 toward the distributed constant line 3433.

As described above, distributed constant filters according to the third embodiment and the modification allow reduction in degradation of characteristics of a distributed constant filter due to manufacturing variation between distributed constant line resonators and achievement of reduction in loss.

Fourth Embodiment

A fourth embodiment will describe a configuration in which a plurality of distributed constant lines arranged in layers function as an antenna element.

Figure 24:
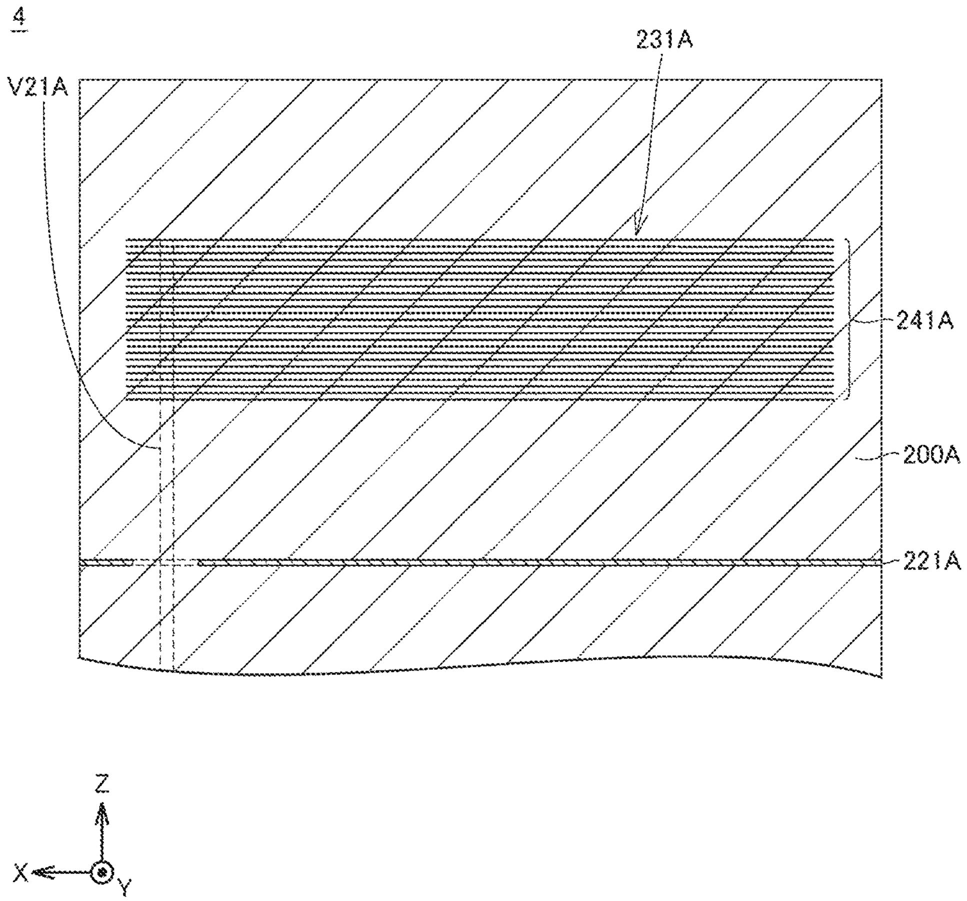
FIG. 24 is a sectional view of an antenna module according to a fourth embodiment.

FIG. 24 is a sectional view of an antenna module 4 according to the fourth embodiment. As shown in FIG. 24, the antenna module 4 includes a dielectric substrate 200A, a distributed constant line resonator 231A, a ground electrode 221A, and a via conductor V21A.

The dielectric substrate 200A is formed from a plurality of dielectric layers stacked in a Z-axis direction. The distributed constant line resonator 231A extends in an X-axis direction inside the dielectric substrate 200A.

The distributed constant line resonator 231A includes a plurality of distributed constant lines 241A. Each of the plurality of distributed constant lines 241A forms a distributed constant line which extends in the X-axis direction and has a normal line in the Z-axis direction. Each of the plurality of distributed constant lines 241A is arranged at any of the plurality of dielectric layers forming the dielectric substrate 200A. That is, the plurality of distributed constant lines 241A are arranged in layers at spacings corresponding to a thickness of a dielectric layer in the Z-axis direction. The spacing between conductors adjacent in the Z-axis direction need not be uniform in the plurality of distributed constant lines 241A.

The via conductor V21A extends through the ground electrode 221A. The via conductor V21A is insulated from the ground electrode 221A. The via conductor V21A connects the plurality of distributed constant lines 241A to, for example, a radio frequency integrated circuit (RFIC). The plurality of distributed constant lines 241A transmit a radio frequency signal from the RFIC to outside the antenna module 4. The plurality of distributed constant lines 241A receives a radio frequency signal from outside the antenna module 4 and transfers the radio frequency signal to the RFIC. That is, the distributed constant lines 241A function as an antenna element.

As described above, an antenna module according to the fourth embodiment allows reduction in degradation of characteristics of an antenna module due to manufacturing variation between distributed constant line resonators and achievement of reduction in loss.

Fifth Embodiment

A fifth embodiment will describe a multiplexer including distributed constant filters according to the first to third embodiments.

Figure 25:
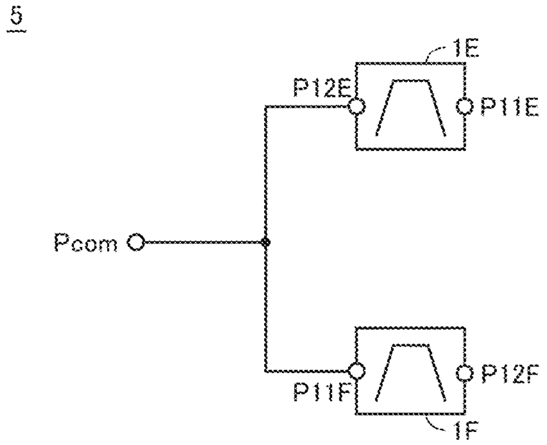
FIG. 25 is an equivalent circuit diagram of a duplexer as an example of a multiplexer according to a fifth embodiment.

FIG. 25 is an equivalent circuit diagram of a duplexer 5 as an example of a multiplexer according to the fifth embodiment. As shown in FIG. 25, the duplexer 5 includes distributed constant filters 1E and 1F and a common terminal Pcom. The distributed constant filter 1E includes a terminal P11E (a first terminal) and a terminal P12E (a second terminal). The distributed constant filter 1F includes a terminal P11F (a first terminal) and a terminal P12F (a second terminal). The common terminal Pcom is connected to the terminal P12E of the distributed constant filter 1E and is connected to the terminal P11F of the distributed constant filter 1F. A pass band of the distributed constant filter 1E is different from a pass band of the distributed constant filter 1F. That is, the size of the distributed constant filter 1E is different from the size of the distributed constant filter 1F.

Figure 26:
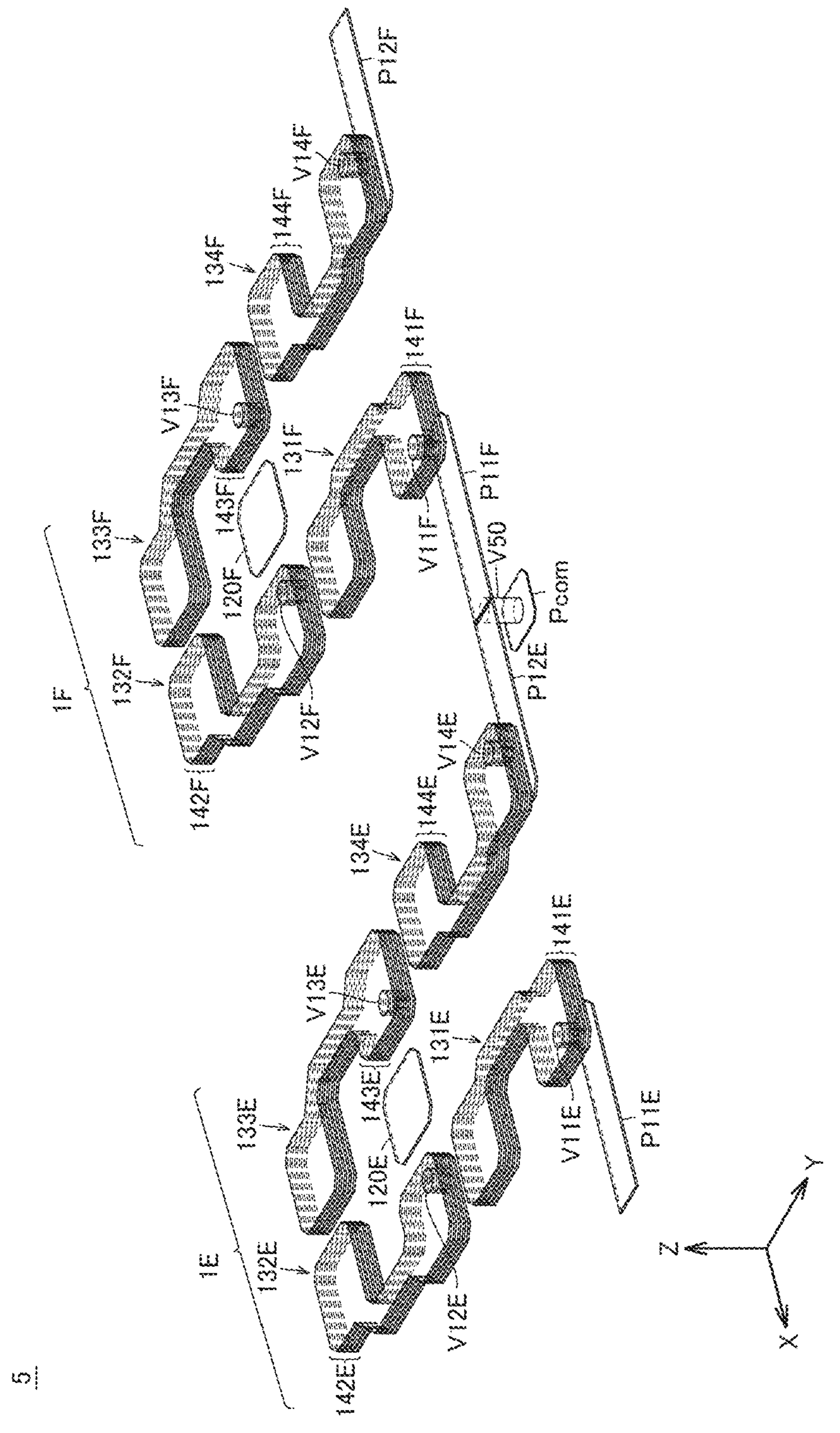
FIG. 26 is a perspective view showing a plurality of electrodes forming the duplexer in FIG. 25.

FIG. 26 is a perspective view showing a plurality of electrodes forming the duplexer 5 in FIG. 25. In FIG. 26, a case where each of the distributed constant filters 1E and 1F in FIG. 25 is a distributed constant filter according to the first embodiment is illustrated. A reference character obtained by removing a last alphabetical letter from a reference character for each of a plurality of electrodes included in the distributed constant filters 1E and 1F denotes, of the plurality of electrodes shown in FIG. 4, an electrode which the electrode corresponds to. Since respective structures of the distributed constant filters 1E and 1F are the same as that of the distributed constant filter 1 shown in FIG. 4, a description thereof will not be repeated. As shown in FIG. 26, the terminals P12E and P11F are connected to the common terminal Pcom by a via conductor V50.

Note that distributed constant filters included in a multiplexer according to the fifth embodiment are not limited to distributed constant filters according to the first embodiment and may be distributed constant filters according to the first to fourth modifications of the first embodiment, the second embodiment, and the third embodiment and the modification. The number of distributed constant filters included in a multiplexer according to the fifth embodiment is not limited to two and may be three or more. That is, multiplexers according to the fifth embodiment are not limited to a duplexer and a diplexer and include, for example, a triplexer, a quadplexer, or a pentaplexer. Additionally, the distributed constant filters 1E and 1F may be juxtaposed on a certain plane (for example, an XY plane) or may be arranged in layers in a direction orthogonal to such a plane (for example, a Z-axis direction).

As described above, a multiplexer according to the fifth embodiment allows reduction in degradation of characteristics of a multiplexer due to manufacturing variation between distributed constant line resonators and achievement of reduction in loss.

Note that a via conductor as described above which connects a plurality of distributed constant lines together need not be integrally formed. For each two distributed constant lines adjacent in a stacking direction of a plurality of dielectric layers, a conductor which connects the two distributed constant lines together may be formed, and a plurality of conductors formed at spacings for the plurality of distributed constant lines may form the via conductor on the whole. The plurality of conductors need not overlap perfectly when viewed in plan view from the stacking direction, and a central axis of each of the conductors may be shifted alternately to two different sides for every dielectric layer.

The embodiments disclosed herein are also expected to be appropriately combined without contradiction and carried out. It should be appreciated that the embodiments disclosed herein are to be regarded as illustrative in all respects and not restrictive. The scope of the present invention is indicated by the scope of the claims rather than the above description, and is intended to include all changes that come within the meaning and the scope of equivalents of the claims.

REFERENCE SIGNS LIST

1 to 3, 1A to 1F, 4 antenna module
5 duplexer
10 distributed constant filter
11 to 14, 131 to 134, 131E to 134E, 131F to 134F, 131B, 132A, 133A, 133C, 134B, 134C, 231, 231A, 232, 331, 332 distributed constant line resonator
100, 200, 200A dielectric substrate
120, 120E, 120F coupling electrode
121, 122, 211 to 214, 221, 221A, 222 ground electrode
1311, 1312, 1321, 1322, 1331, 1332, 1341, 1342 end portion
1313, 1323, 1333, 1343 intermediate portion
141 to 144, 141E to 144E, 141F to 144F, 141B, 142A, 143A, 143C, 144B, 144C, 241, 241A, 242, 341, 341A, 342, 342A distributed constant lines
3411 to 3414, 3431 to 3433 distributed constant line
150 ground conductor portion
BF1, BF2 bottom surface
F11 to F14, F21 to F24 side surface
P11, P11E, P11F, P12, P12E, P12F, P21, P22 input/output terminal
UF1, UF2 upper surface
V10 to V14, V11B, V11E to V14E, V11F to V14F, V12A, V13A, V13C, V14B, V14C, V21, V21A, V22, V31, V32, V50 via conductor

The invention claimed is:

1. A distributed constant filter comprising:
at least one resonator that is not grounded; and
a first ground electrode that faces the at least one resonator in a first direction, wherein
each resonator of the at least one resonator is a distributed constant line resonator,
each resonator of the at least one resonator includes
a plurality of distributed constant lines that are arranged in layers in the first direction, and
a via conductor that extends in the first direction, and
each distributed constant line of the plurality of distributed constant lines is connected to the via conductor only at one end portion of the distributed constant line,
wherein a length of each distributed constant line of the plurality of distributed constant lines is one-half of a specified wavelength.

2. The distributed constant filter according to claim 1, further comprising:
a second ground electrode that is grounded, wherein
the at least one resonator is arranged between the first ground electrode and the second ground electrode.

3. The distributed constant filter according to claim 2, further comprising:
a ground conductor that connects the first ground electrode and the second ground electrode and surrounds the at least one resonator.

4. The distributed constant filter according to claim 2, wherein
each of the plurality of distributed constant lines extends in a second direction orthogonal to the first direction,
a length of each resonator of the at least one resonator is a specified length and is arranged in a third direction that is orthogonal to each of the first direction and the second direction,
the plurality of distributed constant lines include a first distributed constant line, a second distributed constant line, and a third distributed constant line,
of the plurality of distributed constant lines, a distributed constant line other than the first distributed constant line and the second distributed constant line is arranged between the first distributed constant line and the second distributed constant line,
a length of each of the first distributed constant line and the second distributed constant line in the third direction is shorter than the specified length, and
a length of the third distributed constant line is the specified length.

5. The distributed constant filter according to claim 2, wherein
each of the at least one resonator is composed of a first end portion, a second end portion, and an intermediate portion that connects the first end portion with the second end portion,
the intermediate portion extends in a second direction orthogonal to the first direction, and
respective lengths of the first end portion and the second end portion in a third direction orthogonal to each of the first direction and the second direction are longer than a length of the intermediate portion in the third direction.

6. The distributed constant filter according to claim 1, wherein
each of the plurality of distributed constant lines extends in a second direction orthogonal to the first direction,
a length of each resonator of the at least one resonator is a specified length and is arranged in a third direction that is orthogonal to each of the first direction and the second direction,
the plurality of distributed constant lines include a first distributed constant line, a second distributed constant line, and a third distributed constant line,
of the plurality of distributed constant lines, a distributed constant line other than the first distributed constant line and the second distributed constant line is arranged between the first distributed constant line and the second distributed constant line,
a length of each of the first distributed constant line and the second distributed constant line in the third direction is shorter than the specified length, and
a length of the third distributed constant line is the specified length.

7. The distributed constant filter according to claim 1, wherein
each of the at least one resonator is composed of a first end portion, a second end portion, and an intermediate portion that connects the first end portion with the second end portion,
the intermediate portion extends in a second direction orthogonal to the first direction, and
respective lengths of the first end portion and the second end portion in a third direction orthogonal to each of the first direction and the second direction are longer than a length of the intermediate portion in the third direction.

8. The distributed constant filter according to claim 7, further comprising:

a first terminal and a second terminal, wherein the at least one resonator includes a first resonator and a second resonator that face each other in the third direction, one end portion of the first resonator is electrically connected to the first terminal, one end portion of the second resonator is electrically connected to the second terminal, the first resonator curves away from the second resonator at both end portions of the first resonator, and the second resonator curves away from the first resonator at both end portions of the second resonator.

9. The distributed constant filter according to claim 8, wherein a layer number of a plurality of distributed constant lines included in the first resonator is different from a layer number of a plurality of distributed constant lines included in the second resonator.

10. The distributed constant filter according to claim 9, wherein the at least one resonator further includes a third resonator and a fourth resonator which face each other in the third direction, one end portion of the third resonator faces the other end portion of the first resonator in the second direction, one end portion of the fourth resonator faces the other end portion of the second resonator in the second direction, the third resonator curves toward the fourth resonator at the other end portion of the third resonator, the fourth resonator curves toward the third resonator at the other end portion of the fourth resonator, and the other end portion of the third resonator faces the other end portion of the fourth resonator.

11. The distributed constant filter according to claim 10, wherein a number of layers of a plurality of distributed constant lines included in the third resonator is different from a number of layers of a plurality of distributed constant lines included in the fourth resonator.

12. The distributed constant filter according to claim 11, wherein the number of layers of the plurality of distributed constant lines included in the third resonator is larger than each of the number of layers of the plurality of distributed constant lines included in the first resonator and the number of layers of the plurality of distributed constant lines included in the second resonator, and the number of layers of the plurality of distributed constant lines included in the fourth resonator is larger than each of the number of layers of the plurality of distributed constant lines included in the first resonator and the number of layers of the plurality of distributed constant lines included in the second resonator.

13. A distributed constant line resonator comprising:

a plurality of distributed constant lines that are arranged in layers in a first direction and are not grounded; and a via conductor that extends in the first direction, wherein each distributed constant line of the plurality of distributed constant lines is connected to the via conductor only at one end portion of the distributed constant line, wherein a length of each distributed constant line of the plurality of distributed constant lines is one-half of a specified wavelength.

14. The distributed constant line resonator according to claim 13, wherein each distributed constant line of the plurality of distributed constant lines extends in a second direction orthogonal to the first direction, a length of the distributed constant line resonator in a third direction orthogonal to each of the first direction and the second direction is a specified length, the plurality of distributed constant lines include a first distributed constant line, a second distributed constant line, and a third distributed constant line, of the plurality of distributed constant lines, a distributed constant line other than the first distributed constant line and the second distributed constant line is arranged between the first distributed constant line and the second distributed constant line, a length of each of the first distributed constant line and the second distributed constant line in the third direction is shorter than the specified length, and a length of the third distributed constant line is the specified length.

15. The distributed constant line resonator according to claim 13, wherein the distributed constant line resonator is composed of a first end portion, a second end portion, and an intermediate portion that connects the first end portion and the second end portion, the intermediate portion extends in a second direction orthogonal to the first direction, and a length of each of the first end portion and the second end portion in a third direction orthogonal to each of the first direction and the second direction is longer than a length of the intermediate portion in the third direction.

16. A multiplexer comprising:

a plurality of distributed constant filters, wherein at least one of the distributed constant line filters includes a distributed constant line filter that includes at least one resonator that is not grounded, and a first ground electrode that faces the at least one resonator in a first direction, wherein each resonator of the at least one resonator is a distributed constant line resonator, each resonator of the at least one resonator includes a plurality of distributed constant lines that are arranged in layers in the first direction, and a via conductor that extends in the first direction, and each distributed constant line of the plurality of distributed constant lines is connected to the via conductor only at one end portion of the distributed constant line, wherein a length of each distributed constant line of the plurality of distributed constant lines is one-half of a specified wavelength.

* * * * *